(12) United States Patent  (10) Patent No.: US 6,195,325 B1
Okanishi  (45) Date of Patent: Feb. 27, 2001

(54) DATA RECORDING APPARATUS AND METHOD

(75) Inventor: Toshiharu Okanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/204,425

(22) Filed: Dec. 3, 1998

(30) Foreign Application Priority Data

Dec. 5, 1997 (JP) .................................... P09-336154

(51) Int. Cl.$^7$ ........................................... G11B 7/00
(52) U.S. Cl. ........................... 369/124.08; 369/54
(58) Field of Search .................... 369/44.13, 44.27, 369/44.28, 44.31, 47, 48, 50, 54, 58, 59, 124.07, 124.08

(56) References Cited

U.S. PATENT DOCUMENTS 5,815,486 * 9/1998 Kobayashi et al. ............. 369/59 X
5,991,257 * 11/1999 Kobayashi et al. ............. 369/48 X
6,067,281 * 5/2000 Kobayashi et al. ............. 369/59 X

* cited by examiner

*Primary Examiner*—Paul W. Huber
(74) *Attorney, Agent, or Firm*—Limbach & Limbach L.L.P.; Seong-Kun Oh

(57) ABSTRACT

For recording data into a disc-like recording medium without any lower linear density in data tracks in the lead out zone even in the CAV mode, a radial position on the recording medium of an n-th one of the sectors is calculated to generate a position information; a write frequency is determined based of the position information; a number of bits which are to be recorded into the n-th one of the sectors is calculated based on a following expression (1):

$$\frac{F}{2\pi \cdot N} \cdot \frac{2\pi}{P}\left(\sqrt{R_0^2 + \frac{PL}{\pi}(n+1)} - \sqrt{R_0^2 + \frac{PL}{\pi}n}\right) \quad (1)$$

where
F: Write frequency, Hz
N: Spinning speed of the recording medium, s$^{-1}$
$R_0$: Radius of innermost data track on which the bits are to be recorded, m
P: Track pitch of data tracks, m
L: Physical circumferential length of each sector, m; and a data in the number of bits calculated based on the expression (1) is recorded into the recording medium on the basis of the write frequency.

9 Claims, 20 Drawing Sheets

| Sync Pattern | 91 16-bit fields | Sync Pattern | 91 16-bit fields | |
|---|---|---|---|---|
| SY0 | Linking Data | SY5 | Linking Data | Linking Data |
| SY1 | Linking Data | SY5 | Linking Data ||
| SY2 | Linking Data | SY5 | Linking Data ||
| SY3 | Linking Data | SY5 | Linking Data ||
| SY4 | Linking Data | SY5 | Linking Data ||
| SY1 | Linking Data | SY6 | Linking Data ||
| SY2 | Linking Data | SY6 | Linking Data ||
| SY3 | Linking Data | SY6 | Linking Data ||
| SY4 | Linking Data | SY6 | Linking Data ||
| SY1 | Linking Data | SY7 | Linking Data ||
| SY2 | Linking Data | SY7 | Linking Data ||
| SY3 | Linking Data | SY7 | Linking Data ||
| SY4 | Linking Data | SY7 | Linking Data ||

FIG.14

DATA RECORDING APPARATUS AND METHOD

BACKGROUND OF THE INVENTION

1. Field of the Invention

The present invention relates to an apparatus for and a method of recording data into a disc-like recording medium driven to spin at a constant speed.

2. Description of Related Art

The conventional apparatuses for recording data into a recording medium include one adapted to record data into sectors formed on a magnetooptic disc by regularly dividing concentric tracks on the disc circumferentially thereof, one adapted to record data into a magnetooptic disc at a constant frequency and a constant speed of disc spinning, and one adapted to record data into a phase-changing optical disc at a constant frequency and a constant speed of disc spinning.

The above-mentioned data recording apparatus adapted to record data into a magnetooptic disc having sectors formed thereon by regularly dividing concentric tracks circumferentially of the disc, adopts the well-known CLV (Constant Linear Velocity) method to attain a high surface density with a constant linear density by recording the data at a constant linear velocity. For recording data into a magnetooptic disc having wobbling data tracks, this data recording apparatus detects track wobbling modulated for data to be recorded onto all data tracks with a same linear density in order to record the data at a constant frequency.

On the other hand the above-mentioned data recording apparatus adapted to record data into a magnetooptic disc at a constant frequency and a constant speed of disc spinning adopts the well-known CAV (Constant Angular Velocity) method to record the data at a constant speed of disc spinning not only in the lead-in zone but in the lead-out zone on the magnetooptic disc.

The above-mentioned data recording apparatus adapted to record data into a phase-changing optical disc at a constant frequency and a constant speed of disc spinning, adopts the CAV method as in the data recording apparatus mentioned just above. This data recording apparatus is also adapted to generate a write frequency by detecting a fine clock mark in order to record the data.

In the above-mentioned data recording apparatus adopting the CAV method for data recording into a phase-changing optical disc, however, the linear density of recording on data tracks formed in the lead-out zone is lower than that on the data tracks in the lead-in zone since data is recorded at a constant speed of disc spinning and a constant frequency not only in the data tracks formed in the lead-in zone but also in the data tracks formed in the lead-in zone. Also, in a disc having track wobbles modulated for data to be recorded onto all data tracks with a same linear density, the CAV control is impossible for a quicker data access since it is necessary to lock write clocks precisely to the track wobbles.

SUMMARY OF THE INVENTION

Accordingly, the present invention overcomes the above-mentioned drawbacks of the prior art by providing a data recording apparatus and method adapted to record data into a disc-like recording medium without any lower linear density on data tracks in the lead-out zone even in the CAV mode.

The above goal can be attained by providing a data recording apparatus comprising, according to the present invention:

means for driving a disc-like recording medium having pre-formed thereon data tracks for data recording, the data tracks being wobbled with signals generated by modulating the frequency of a predetermined-frequency carrier correspondingly to an address information;

means for recording into the disc-like recording medium being driven to spin a data in sectors each consisting of a data block and a linking data next to the data block in such a manner that the linear density of recording is constant;

means for calculating a number of bits which are to be recorded into an n-th one of the sectors based on a following expression (1):

$$\frac{F}{2\pi \cdot N} \cdot \frac{2\pi}{P} \left( \sqrt{R_0^2 + \frac{PL}{\pi}(n+1)} - \sqrt{R_0^2 + \frac{PL}{\pi}n} \right) \quad (1)$$

where

F: Write frequency, Hz

N: Spinning speed of the recording medium, $s^{-1}$ $R_0$: Radius of innermost data track on which the bits are to be written, m P: Track pitch of data tracks, m L: Physical circumferential length of each sector, m; and means for controlling the recording means so that the data is recorded in a number of bits having been calculated by the calculating means into each sector.

In the data recording apparatus according to the present invention, a number of bits to be recorded into each sector is calculated by the calculating means to record data in the calculated number of bits into each sector.

The above object can also be attained by providing a method of recording sectors each consisting of a data block and a linking data next to the data block into a disc-like recording medium having pre-formed thereon data tracks onto which data is to be recorded, the data tracks being wobbled with signals generated by modulating the frequency of a predetermined-frequency carrier correspondingly to an address information, comprising, according to the present invention, the steps of:

calculating a radial position on the recording medium of an n-th one of the sectors to generate a position information;

determining a write frequency based of the position information;

calculating a number of bits which are to be recorded into the n-th one of the sectors based on a following expression (1):

$$\frac{F}{2\pi \cdot N} \cdot \frac{2\pi}{P} \left( \sqrt{R_0^2 + \frac{PL}{\pi}(n+1)} - \sqrt{R_0^2 + \frac{PL}{\pi}n} \right) \quad (1)$$

where

F: Write frequency, Hz

N: Spinning speed of the recording medium, $s^{-1}$ $R_0$: Radius of innermost data track on which the bits are to be written, m P: Track pitch of data tracks, m L: Physical circumferential length of each sector, m; and recording a data in the number of bits calculated based on the expression (1) into the recording medium on the basis of the write frequency.

For recording data into each sector by the data recording method according to the present invention, a position information indicative of a radial position of the sector is generated and a write frequency and a number of bits to be recorded into each sector are calculated based on the position information.

BRIEF DESCRIPTION OF THE DRAWINGS

These objects and other objects, features and advantages of the present intention will become more apparent from the following detailed description of the present invention applied to an optical disc reproducing apparatus when taken in conjunction with the accompanying drawings.

FIG. 14 shows a linking point of a linking data.

DETAILED DESCRIPTION OF THE PREFERRED EMBODIMENTS

First of all, an optical disc compatible with the data recording apparatus of the present invention will be described concerning its physical structure.

Figure 1:
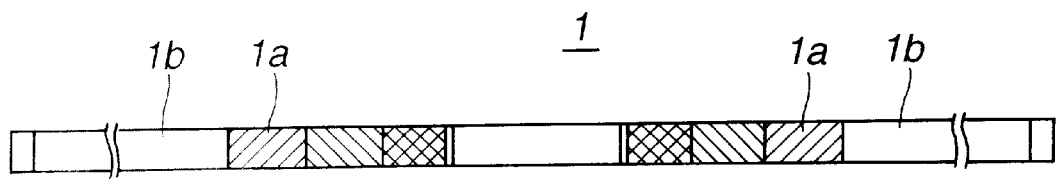
FIG. 1 is a schematic drawing of an example of an optical disc, showing the physical structure thereof.

The optical disc usable with the data recording apparatus of the present invention is a one into which data can be recorded in the phase-changing mode and which has a physical organization as shown in FIG. 1.

The optical disc is generally indicated with a reference 1. The optical disc 1 having a diameter of 120 mm. It is a lamination of two bonded substrates each of 0.6 mm in thickness, and thus the optical disc 1 has a total thickness of 1.2 mm. It is adapted to be mechanically clamped. That is, the optical disc 1 appears like a CD (Compact Disc), DVD-ROM (Digital Versatile Disc-ROM or Digital Video Disc-ROM) or the like.

Also a disc case used for loading an optical disc into a disc player is optionally available to accommodate the optical disc 1.

As shown in FIG. 1, the optical disc 1 has a lead-in zone 1a located near the inner perimeter of the optical disc 1 and a data zone 1b disposed outside the lead-in zone 1a. There are preformed groove tracks in the data zone 1b on the optical disc 1. An physical address is represented by a wobbling of the groove. Due to the groove wobbling based on a signal generated by FM modulation of the address, an absolute address can be extracted by FM demodulation of a reproduced information from the groove as will be further described later.

The optical disc 1 is driven to spin in the CAV (Constant Angular Velocity) mode, so the absolute address included in the groove is a CAV data.

The groove has a depth equal to one eighth of a laser wavelength $\lambda$ used for data recording and reproduction, a width of 0.48 $\mu$m on average, and a wobbling amplitude of 12.5 nm on average.

Note that the laser wavelength $\lambda$ is 650 nm (−5/+15 nm) and the numerical aperture (NA) of the optical head of a disc player with which the optical disc is compatible is 0.6.

This optical disc 1 is used in the groove recording mode (no land is used for recording), so the track pitch-directional distance from the center of a groove to that of a neighboring groove is taken as a track pitch. The track pitch of this optical disc 1 is 0.80 $\mu$m.

Also data is recorded into this optical disc 1 with a constant linear density (CLD) of 0.35 $\mu$m/bit (data bit) or 0.175 $\mu$m/bit (channel bit).

Note however that a certain width is set for a range of the linear density and the optical disc 1 is divided radially thereof into a large number of zones so that the linear density is substantially constant over the optical disc 1. This linear density will be called "zoned CLD (zoned Constant Linear Density)" which will be described in further detail later.

Since the optical disc 1 has a data-recordable area and a zoned CLD set in an area corresponding to the disc diameter of 120 mm as will be discussed later, the above-mentioned track pitch of 0.80 $\mu$m will implement a recording density of 3.0 gigabytes per side (one recording layer).

For modulation of a to-be-recorded data, the 8/16 (eight-to-sixteen) modulation method is adopted as in a so-called DVD for a mark-edge recording to a phase-changing recording medium.

Figure 2:
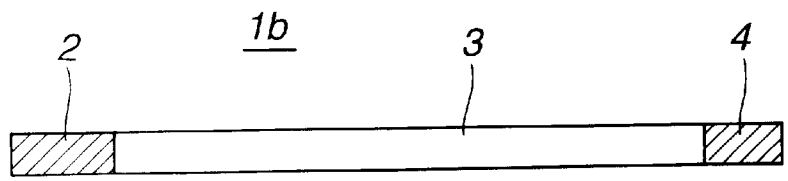
FIG. 2 schematically illustrates a lead-in zone, main data zone and lead-out zone, forming together a data area on an optical disc.

FIG. 2 schematically illustrates the structure of the data zone 1b extending from the lean-in 1a to a lead-out zone 4 on the optical disc 1. Thus the data zone 1b includes an lead-in zone 2, main data zone 3 and lead-out zone 4.

Figure 3:
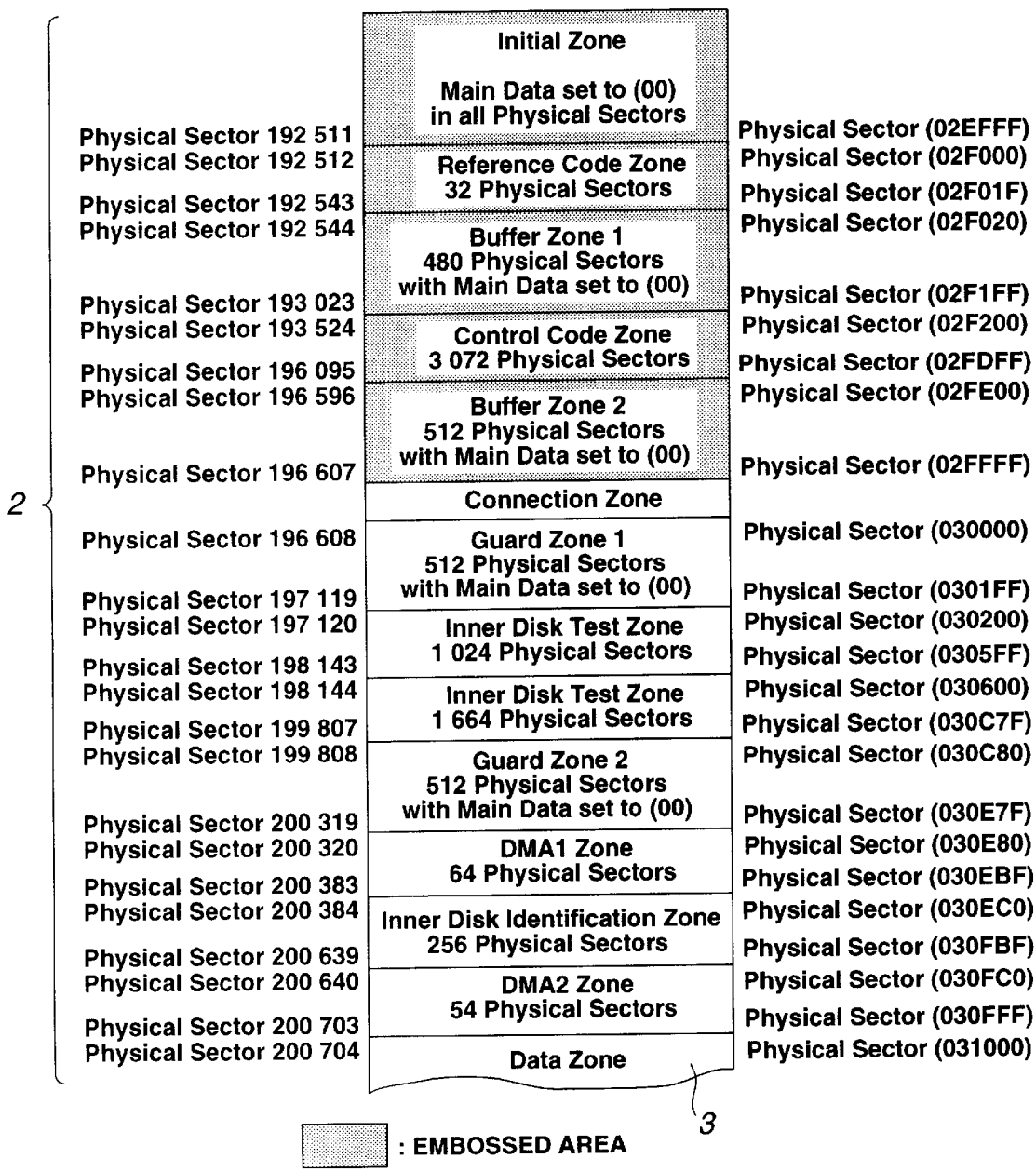
FIG. 3 shows a structure of a lead-in zone on an optical disc.

The lead-in zone 2 has a structure as shown in FIG. 3. It should be noted that a physical sector number is shown to the left of this structural drawing and a hexadecimal notation of an absolute address is to the right.

The lead-in zone 2 has an initial zone where all the physical sectors are set to "00", a reference code zone of 32 physical sectors, a first buffer zone of 480 physical sectors, a control data zone of 3,072 physical sectors, and a second buffer zone of 512 physical sectors.

In these initial, reference code, first buffer, control data and second buffer zones, embossed pits are formed to record information.

The control data and reference code zones are written on the optical disc 1 during cutting in the process of mastering to provide read-only pit codes. There are recorded in the control data zone a physical management information, etc. for the optical disc 1. The zones other than the embossed area provide a data recordable area (groove area) in which groove tracks are formed.

The control data zone is of 192 ECC blocks for recording, in addition to the physical management information for the optical disc 1, information on a spinning speed of the optical disc 1 for data recording, and also information on a spinning speed of the optical disc 1 for data reproduction.

The lead-in zone 2 includes a connection zone indicative of a boundary between the embossed area and grooved area, first guard zone for protection of the disc, disc test zone, drive test zone, second guard zone, first DMA (Defect Management Area) zone, inner disc identification zone indicating an information on the manufacture and format of the disc, and a second DMA zone.

The first and second guard zones are provided for synchronization of write clock when writing an information into the disc test zone and DMA zones.

The disc test zone is provided to check the condition of the optical disc 1.

The drive test zone is provided to check the operating conditions of the optical disc drive.

The first and second DMA zones are formed near the inner perimeter of the optical disc 1, and third and fourth DMA zones are provided near the outer perimeter of the optical disc 1. These first to fourth DMA zones record the same data.

The DMA zones are provided to have recorded therein information on detection of defects, if any, in the recordable area as well as on alternative sectors for the recordable area. Since data is recorded or reproduced with reference to the contents in the DAM zones, the data recording or reproduction can be done bypassing the defective zones.

The data zone has 1,474,560 physical sectors to record user data.

Figure 4:
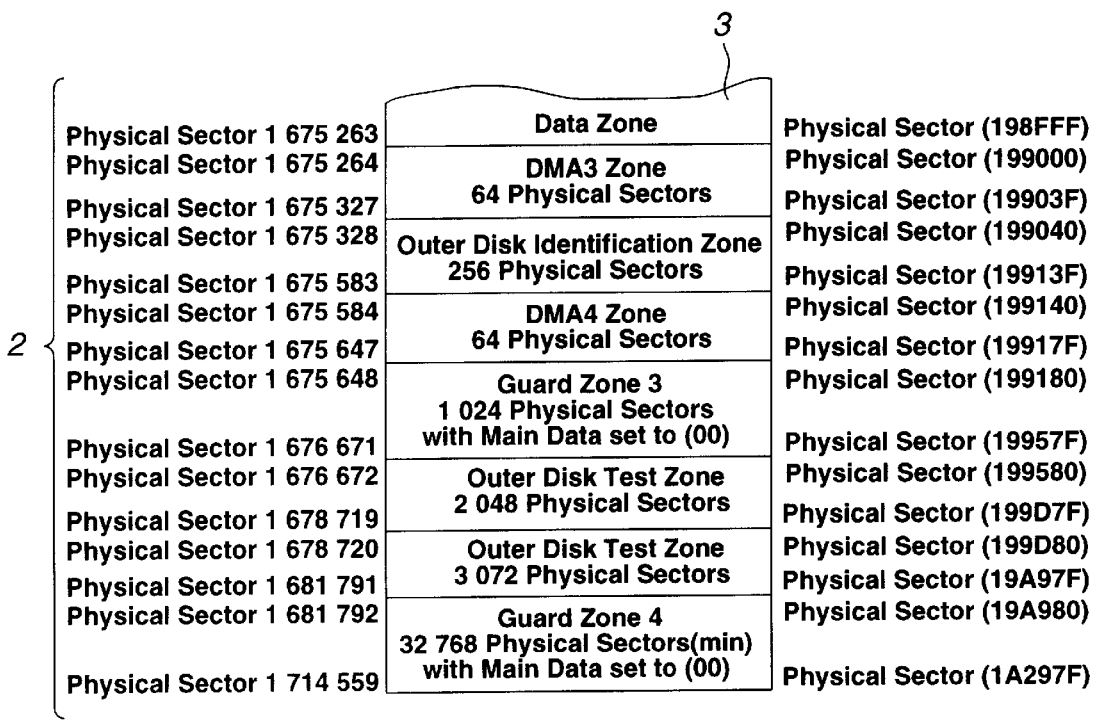
FIG. 4 shows a structure of a lead-out zone on an optical disc.

FIG. 4 shows a structure of the lead-out zone 4 on the optical disc 1. As shown, the lead-out zone 4 includes the third DMA zone, outer disc identification zone, fourth DMA zone, third guard zone, disc test zone, drive test zone and a fourth guard zone.

Next, a wobble address format will be described hereinbelow.

In the optical disc 1 used in this embodiment of the present invention, tracks are pre-formed from wobbling grooves in other grooved areas than the embossed area. Also the wobbling groove represents an absolute address. Therefore, the data recording apparatus according to the present invention can obtain information including the absolute address by extracting a signal according to the wobbled conditions of the grooves while the optical disc 1 is being driven to spin.

Figure 5A:
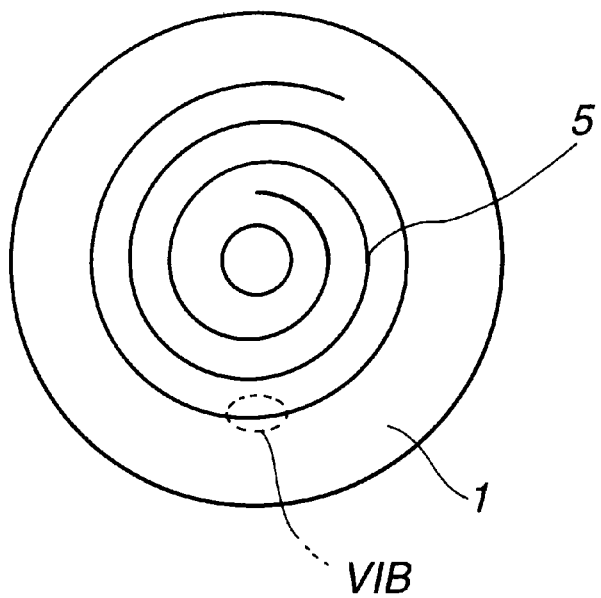
FIG. 5A schematically illustrates a groove spirally formed on an optical disc.

FIG. 5 shows an example of the groove structure on the optical disc 1 used in this embodiment of the present invention. As shown in FIG. 5A, a pre-groove 5 is formed spirally from the inner to outer perimeter in the grooved area on the optical disc 1.

Figure 5B:
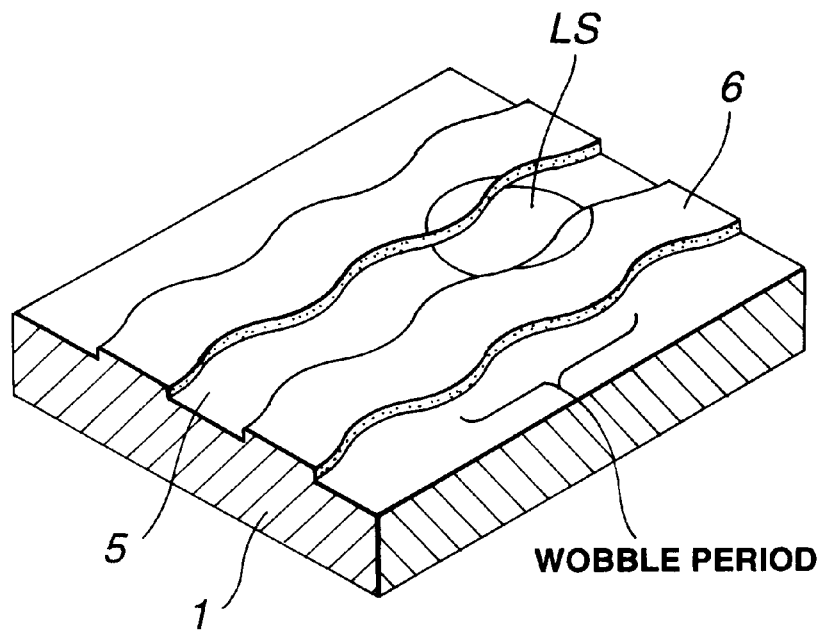
FIG. 5B schematically illustrates a groove wobbled along both sides thereof on an optical disc.

FIG. 5B schematically illustrates, as enlarged in scale, a portion of the pre-groove 5. As shown, the right and left side walls of the pre-groove are wobbled correspondingly to an address information. That is, the pre-groove 5 is wobbled at a predetermined period corresponding to a wobbling signal generated based on an address. A land 6 is formed between one pre-groove 5 and a neighboring pre-groove 5. Data is recorded in the pre-grooves 5.

Figure 6A:
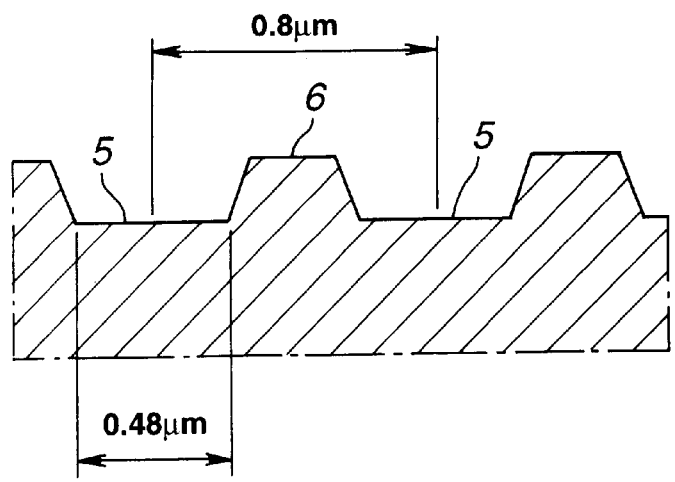
FIG. 6A is a fragmentary sectional view, enlarged in scale, of an optical disc, showing the grooves and lands.

Therefore, the track pitch is a distance from the center of one pre-groove 5 to that of a neighboring pre-groove 5, and it is about 0.8 $\mu$m as shown in FIG. 6A. The pre-groove 5 has a width (bottom width of the groove 5) of about 0.48 $\mu$m, which is larger than the width of the land 6.

Figure 6B:
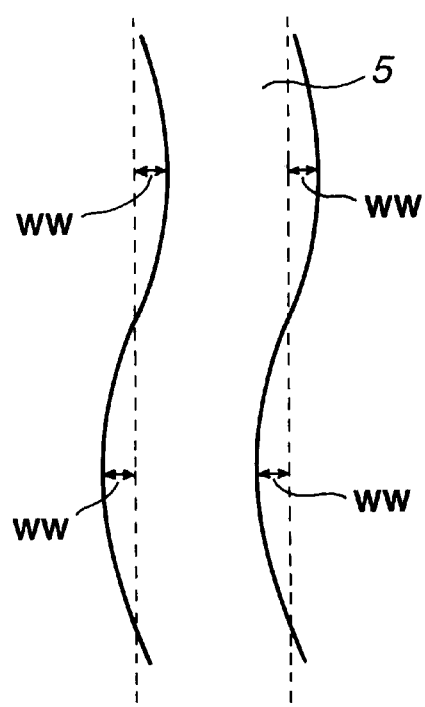
FIG. 6B schematically illustrates a wobbling amplitude of a groove on the optical disc in FIG. 6A.

The pre-groove 5 is formed to wobble as shown in FIG. 5B. The wobbling is defined to have an amplitude WW as shown in FIG. 6B. In the optical disc 1 used in the embodiment of the present invention, the wobbling amplitude WW is about 12.5 nm. Note that in the pre-groove 5, the wobbling is momentarily increased at a certain periodic interval. The momentarily increased wobble is taken as a fine clock mark which will be further described later. The wobbling amplitude WW at such a moment is 25 to 30 nm, for example.

Figure 7:
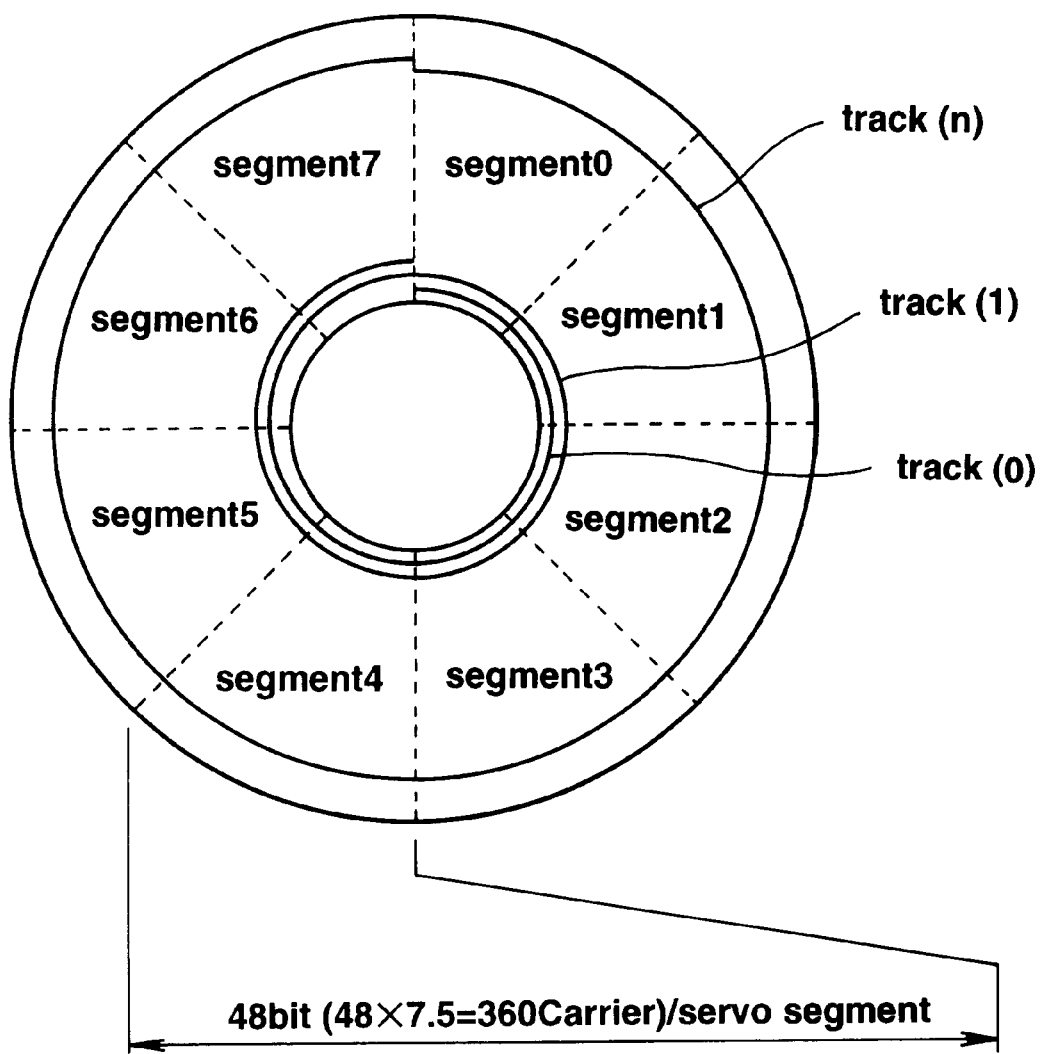
FIG. 7 schematically illustrates an optical disc having segments formed thereon.

One track (one-round track) has a plurality of wobbling address frames. The wobbling address frames are servo segments 0 to 7 formed by dividing one track by eight radially of the optical disc 1 as shown in FIG. 7. One of the servo segments (which will be referred to simply as "segment" hereinbelow) contains 48 bits mainly for an absolute address. One segment has 360 wobbles. The wobbling address frame that is one segment (among segments 0 to 7) includes wobbled grooves formed according to a 48-bit wobble data subjected to FM modulation.

The above-mentioned fine clock marks are formed as regularly spaced on the wobbled groove. The fine clock mark is used in a PLL (phase-locked loop) circuit to generate a reference clock for data recording. On the wobbled groove, 96 fine clock marks are formed per full turn of the optical disc 1. Therefore, such 12 fine clock marks are formed in one segment.

Figure 8:
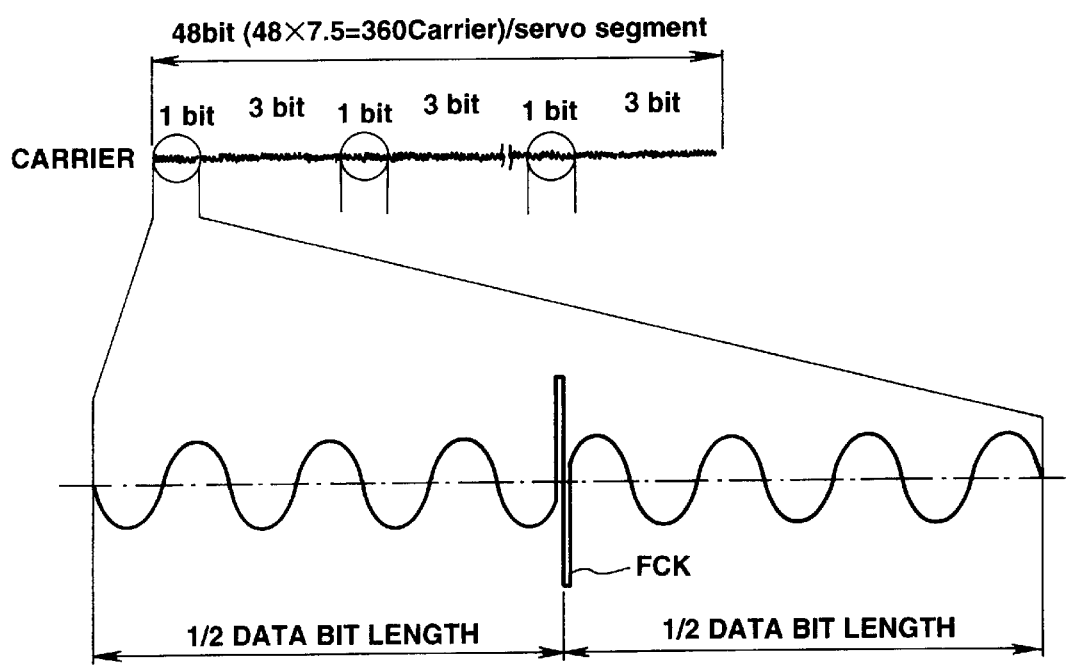
FIG. 8 schematically illustrates a signal detected from a fine clock mark.

FIG. 8 schematically illustrates the fine clock mark. On the assumption as shown in FIG. 8, a data of 48 bits is recorded in each wobbling address frame and one bit is represented by seven carriers of a signal of a predetermined frequency, one wobbling address frame will include 360 carriers. Thus, when the optical disc 1 is driven to spin at a speed of 1,939 turns per minute, the frequency of the carrier will be 93.1 kHz.

For the fine clock mark, one bit is allocated at every 4 bits of the address information. Namely, one fine clock mark is superposed on one of 4 bits included in one period.

The first one of the 4 bits in the period is defined to include the fine clock mark while the remainder includes no fine clock mark. The bit including the fine clock mark is shown as enlarged in scale in the lower portion of FIG. 8. The carrier wave contains an increased-amplitude wave as a fine clock mark FCK at a half of the data bit length, as will be seen.

The actual wobbling of the groove 5 on the optical disc 1 is such that the wobbling amplitude WW is momentarily increased to 30 nm or so at a point corresponding to the fine clock mark FCK.

Twelve fine clock marks will be recorded at every 3 bits in one wobbling address frame. Therefore, one track (one full turn of the optical disc 1) will have 96(=12×8) fine clock marks written therein.

The fine clock mark (which will be used in the PLL circuit of the disc player to generate a PLL clock) can be information indicating a circumferential position in more detail than a segment number.

The frequency of a carrier for each data of 48 bits takes a value for each such data. Each data such as track number, etc. is subjected to bi-phase modulation, and then to frequency modulation. The pre-groove is wobbled with this frequency-modulated wave.

Next, the logical format of a to-be-recorded data will be described hereinbelow.

In this embodiment of the present invention, one cluster consists of one ECC block of 32 kilobytes. Data recording is done in sectors each consisting of an ECC block and a linking data.

Figure 9:
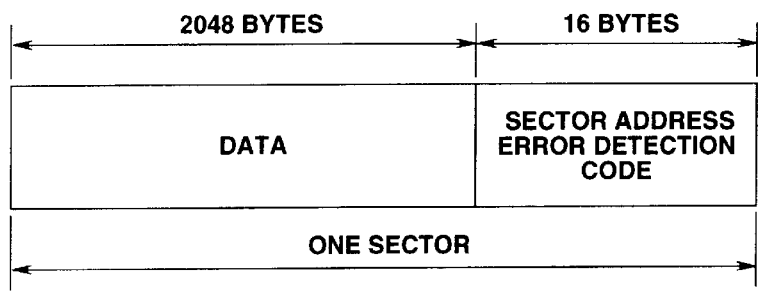
FIG. 9 schematically illustrates the format of one sector.
Figure 10:
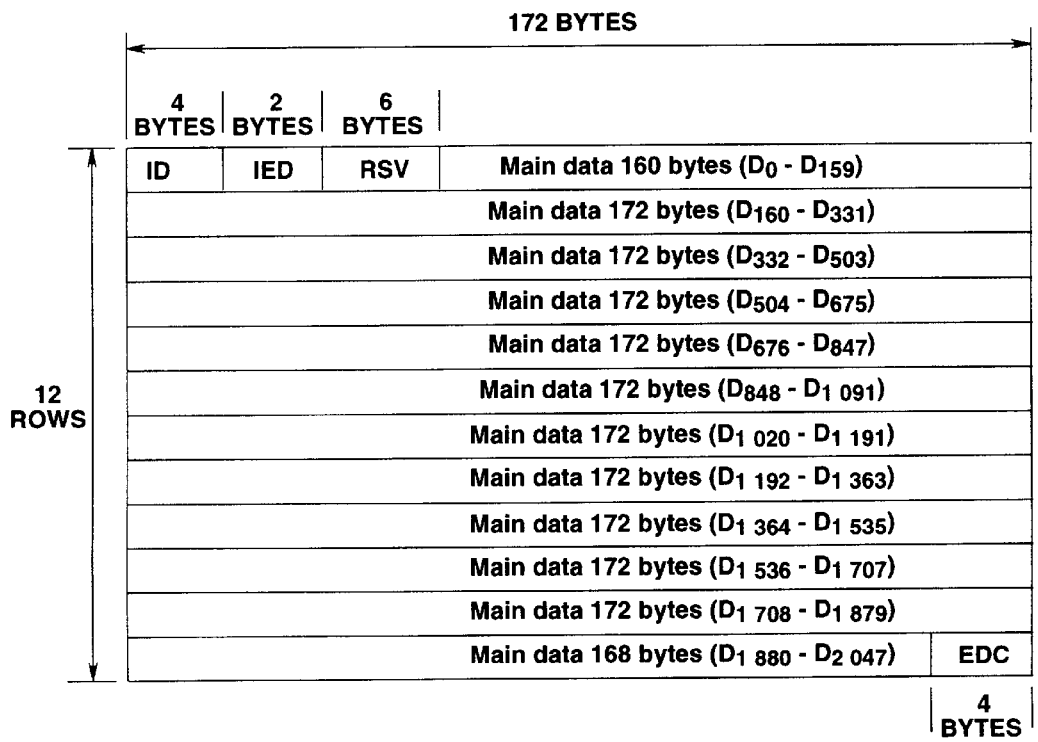
FIG. 10 shows a data structure in an ECC block.

As shown in FIGS. 9 and 10, each sector consists of a main data of about 2 kilobytes (2,048 bytes in detail) and an information of 16 bytes added to the main data. This information includes a 4-byte ID (Identification Data), 2-byte IED (ID Error Detection Code), 6-byte RSV (Reserved Data) and an EDC (Error Detection Code).

Each sector of 2,064(=2,048+16) bytes has a data of 12×172(=2,064) bytes (one sector) shown as one row in FIG. 10. Sixteen such one-sector data are gathered to organize a data of 192(=12×16)×172 bytes as shown in FIGS. 11 and 12.

Figure 11:
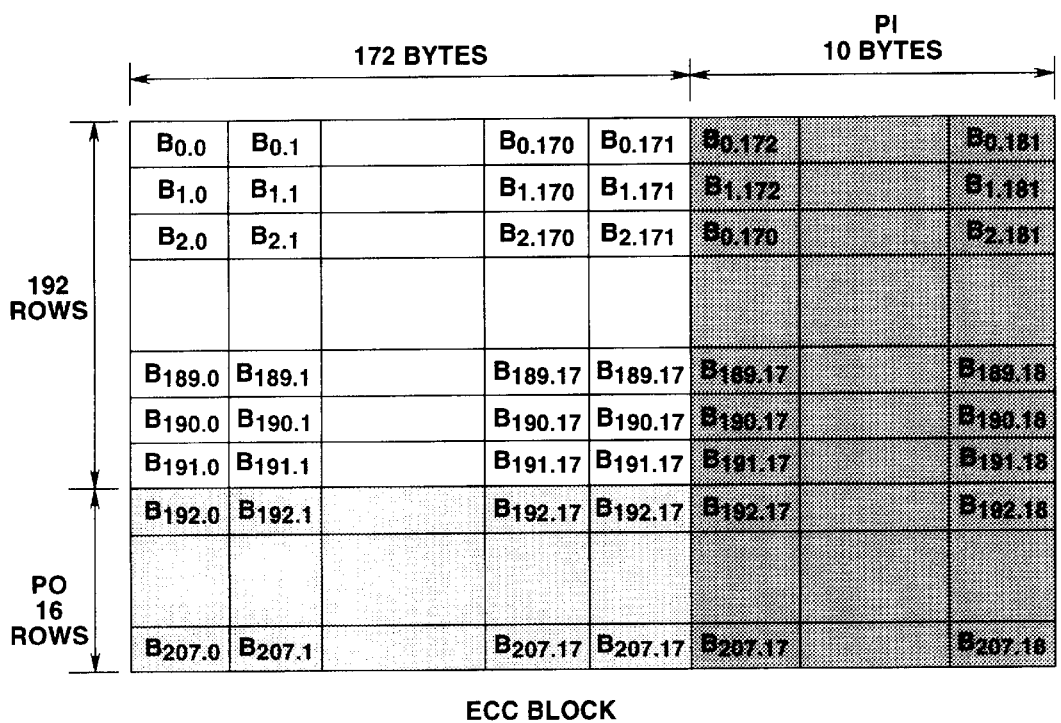
FIG. 11 shows a data structure of 32 kilobytes.
Figure 12:
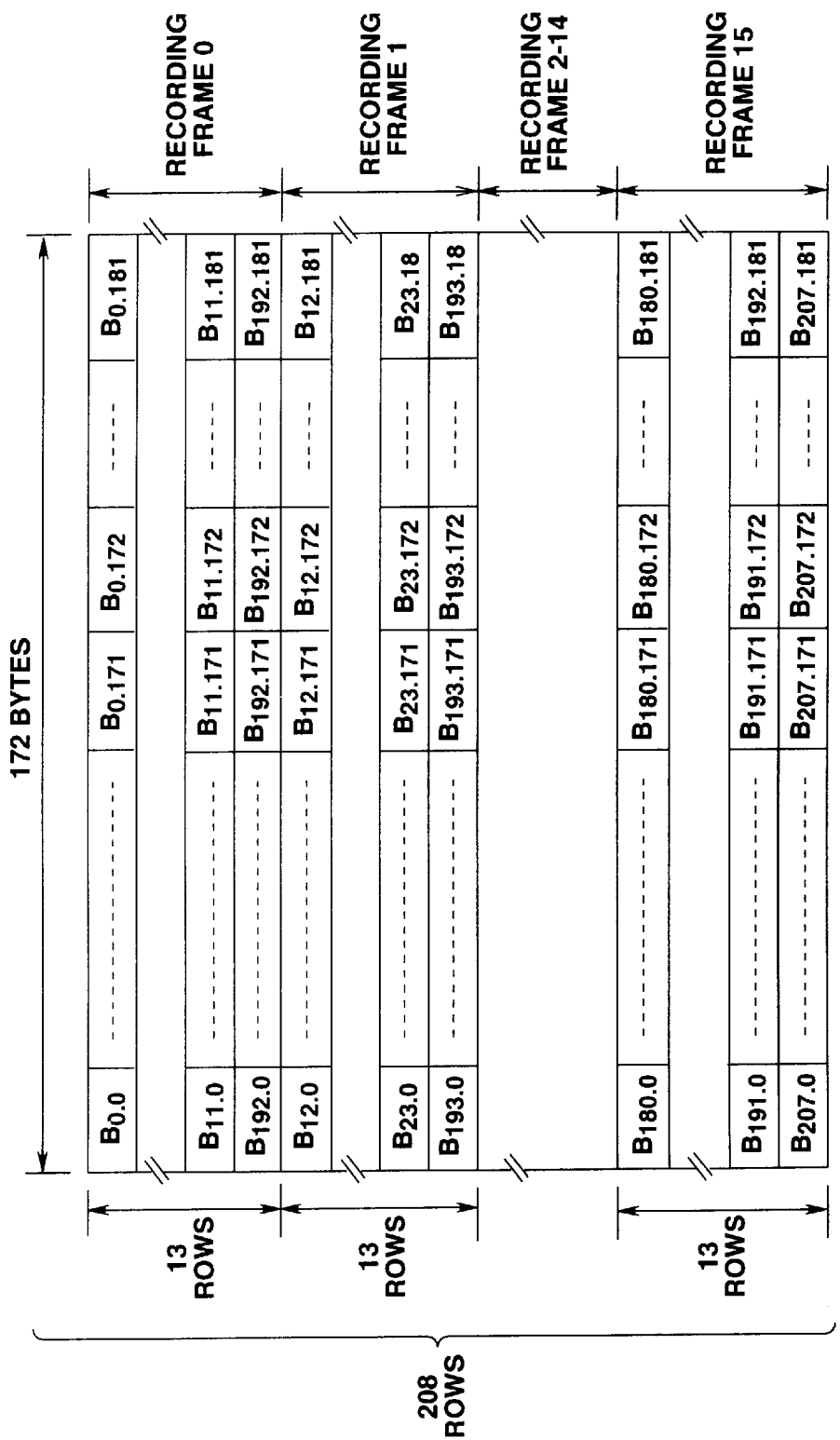
FIG. 12 also shows a data structure of 32 kilobytes.

To this data of 192×172 bytes, an inner parity code (PI) of 10 bytes and an outer parity code (PO) of 16 bytes are added to each of bytes in horizontal and vertical directions to organize an ECC block as shown in FIG. 11.

Further, in the ECC block thus having a total of 208×182 bytes (=(192+16)×(172+10)), an outer parity code (PO) of 16×182 bytes is segmented into 16 chunks of 1×182-byte data and one such outer parity code (PO) is added under each of 16 chunks of 12×182-byte data for interleaving such data chunks. A data of 13(=12+1)×182 bytes is taken for one sector.

Furthermore, a data of 208×182 bytes is vertically divided by 2 into 208 rows×2 frames each having 91 bytes.

Figure 13:
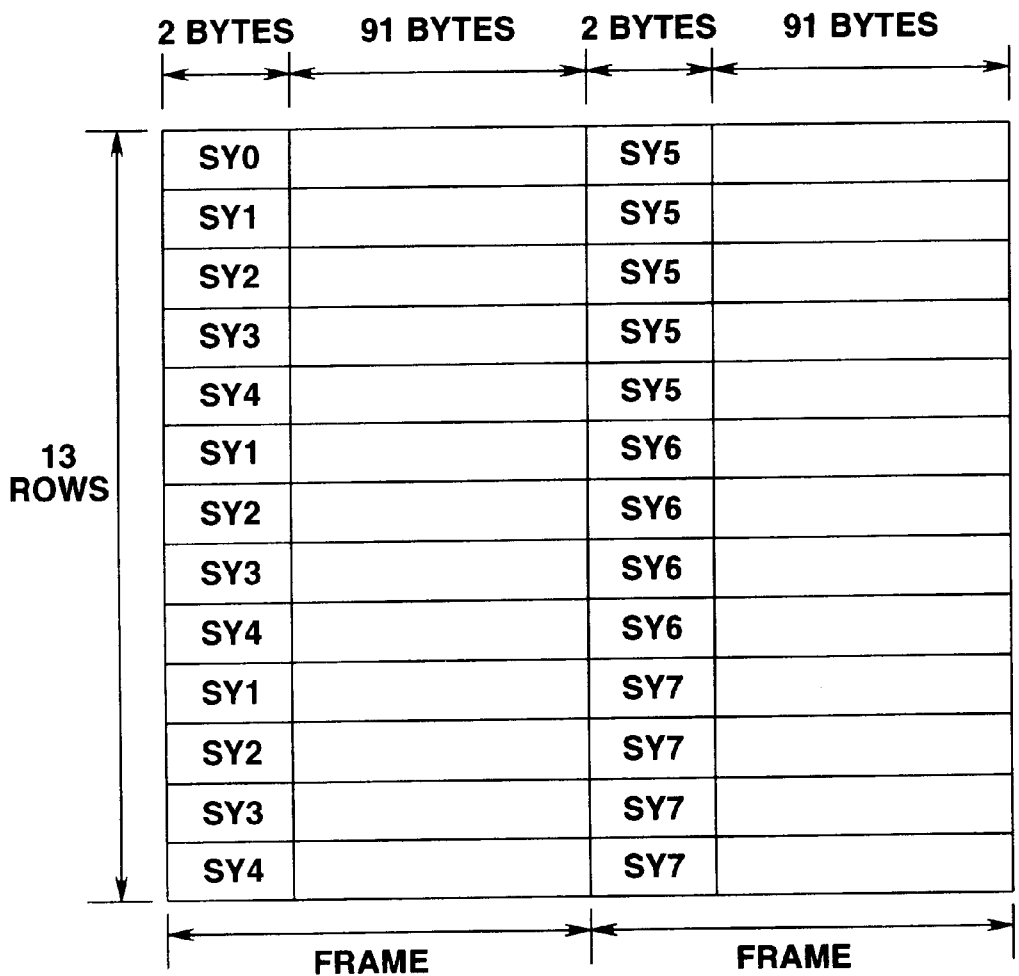
FIG. 13 shows a linking data added to an ECC block.

To leading end of each ECC block having 208×2 frames, a linking data of 13 rows×2 frames, for example, is added as shown in FIG. 13. The linking data has its bits calculated and added to leading or trailing end of each ECC block in the data recording apparatus which will be further described. That is to say, the number of bits is calculated taking the ECC block and linking data as a data for one sector to generate a linking data in the data recording apparatus.

For recording into the optical disc 1, the linking data is inserted between ECC blocks each of 32 kilobytes. It should be noted however that actually, the linking data is formed as a linking point providing a separation between a position at which recording of an ECC block being a block (1) is ended and a position at which recording of an ECC block being a block (N+1) is started.

FIG. 14 shows the patterns of sync signals (SY0 to SY7) of each frame of the linking data and the contents of the linking data.

Figure 15:
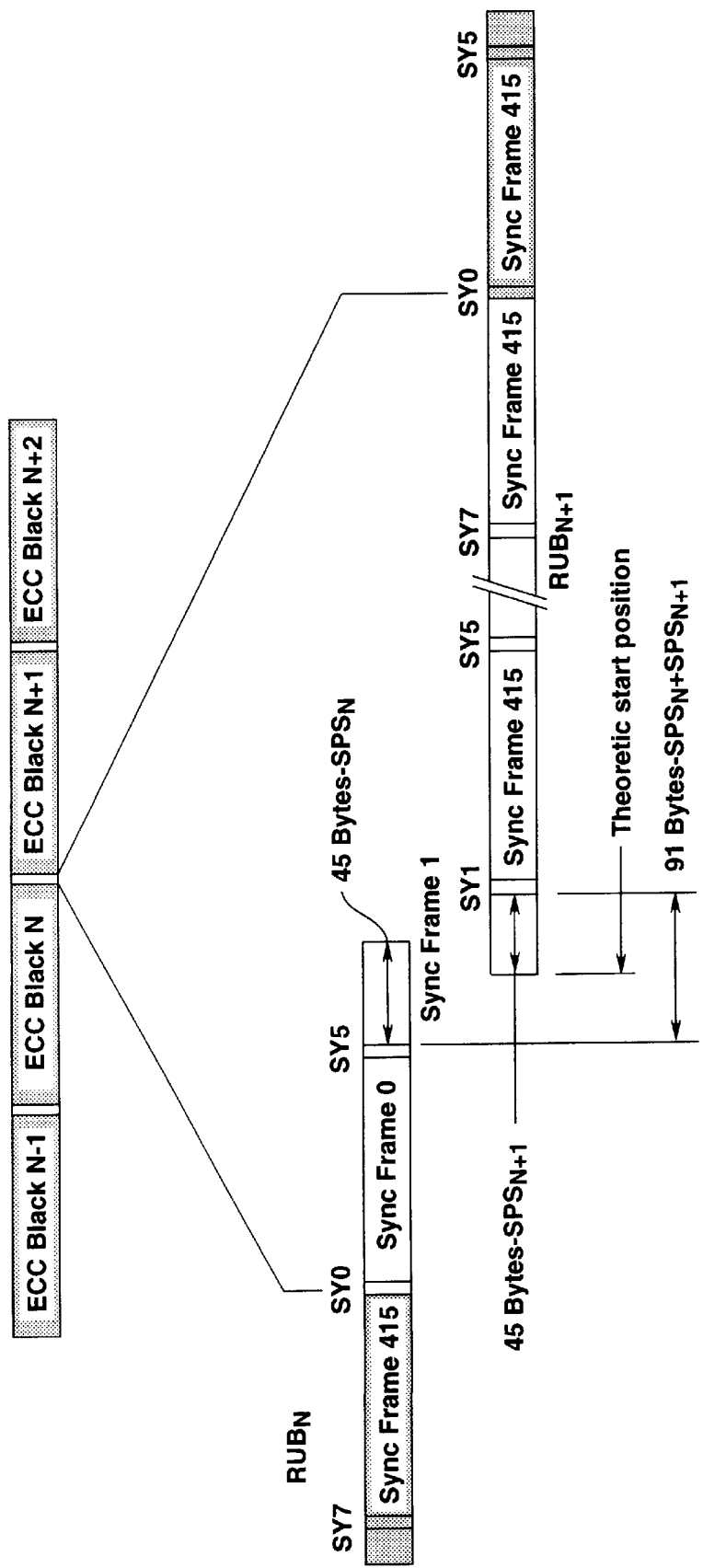
FIG. 15 shows lining data added between ECC blocks.

FIG. 15 shows an example of a linking data added between ECC blocks when sectors N and N+1 are recorded. Namely, FIG. 15 shows a linkage between a linking data added to the trailing end of ECC block N and a linking data added to the leading end of ECC block N+1. In this case, the size of the linking data is changed in this embodiment of the present invention by deleting or adding a linking data belonging to the sector N and/or sector N+1. That is, in this embodiment, the number of bits in a linking data is changed to change the number of bits in each sector.

In the optical disc 1 used in the data recording apparatus according to this embodiment, the CLD method is implemented as a zoned CLD by dividing the optical disc 1 radially into a great number of zones. This zoning will be described hereinbelow.

Figure 16:
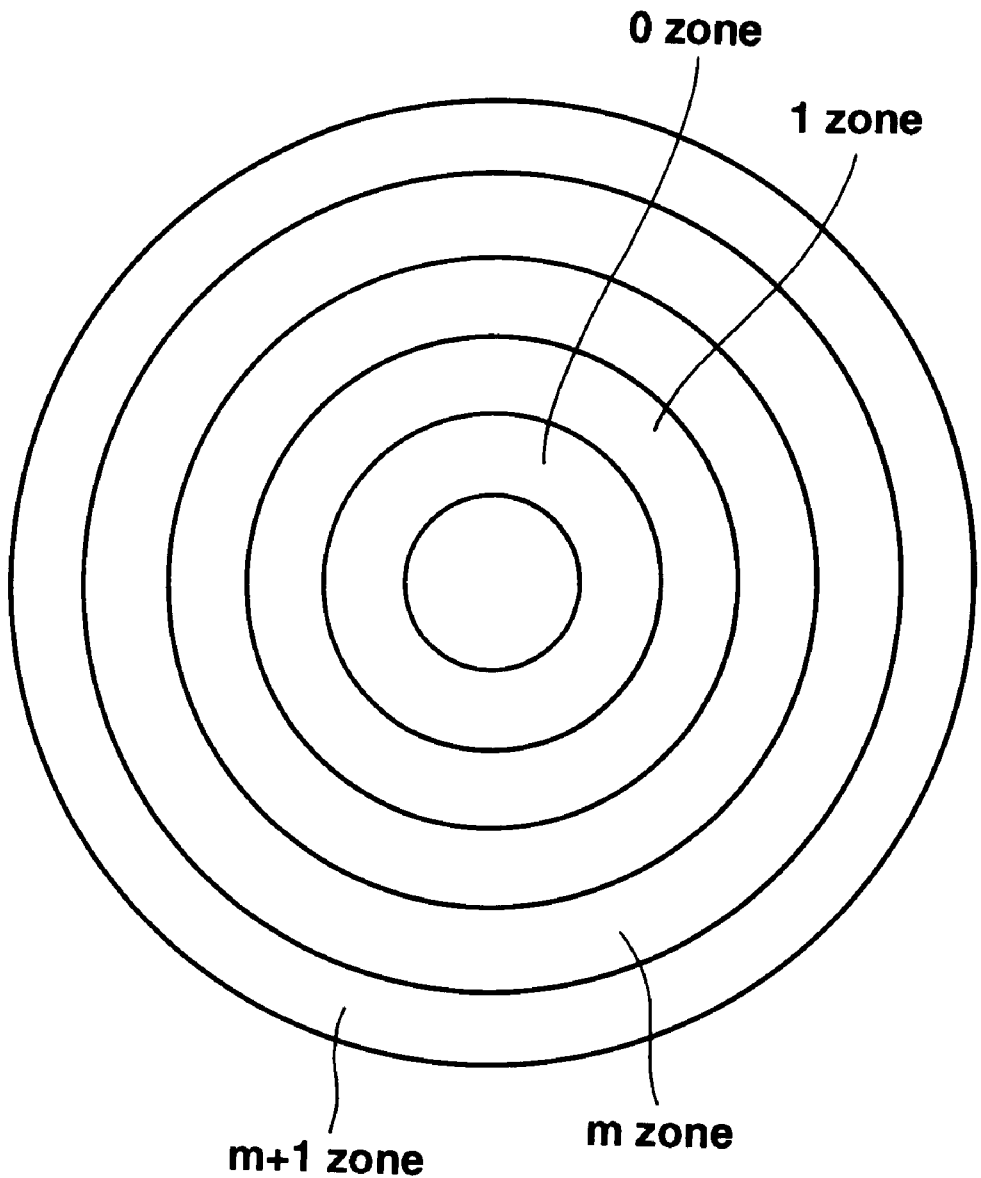
FIG. 16 schematically illustrates a radially zoned optical disc.

FIG. 16 schematically illustrates an example of the optical disc 1 radially divided into a plurality of zones (m+2 zones including zones 0 to m+1). Data is recorded or reproduced into or from these m+2 zones. Actually, an optical disc used in the present invention is divided radially into about 800 zones. In the data recording apparatus that will be described later, the write frequency is changed for each of the zones in order to record data into each sector.

Assume here that the number of sectors per track in the zone 0 is n and the number of sectors per track in the next zone 1 is n+1. Similarly, in each zone counted outwardly from the zone 1, one sector adds to the sectors existing in the preceding zone. Thus the sectors in the zone m counts n+m, and the sectors included in the outermost zone m+1 counts n+(m+1).

The zones are separated from each other at a radial position where one zone can have a capacity for n+1 sectors with a same innermost-zone linear density as in the preceding zone. That is to say, the zone 1 begins at a radial position where it can have a capacity for the n+1 sectors with as same innermost-perimeter linear density as in the zone 0. Similarly, the zone m begins at a radial position where it can have capacity for n+m sectors with a same linear density as the innermost-zone linear density in the zone 0.

Figure 17:
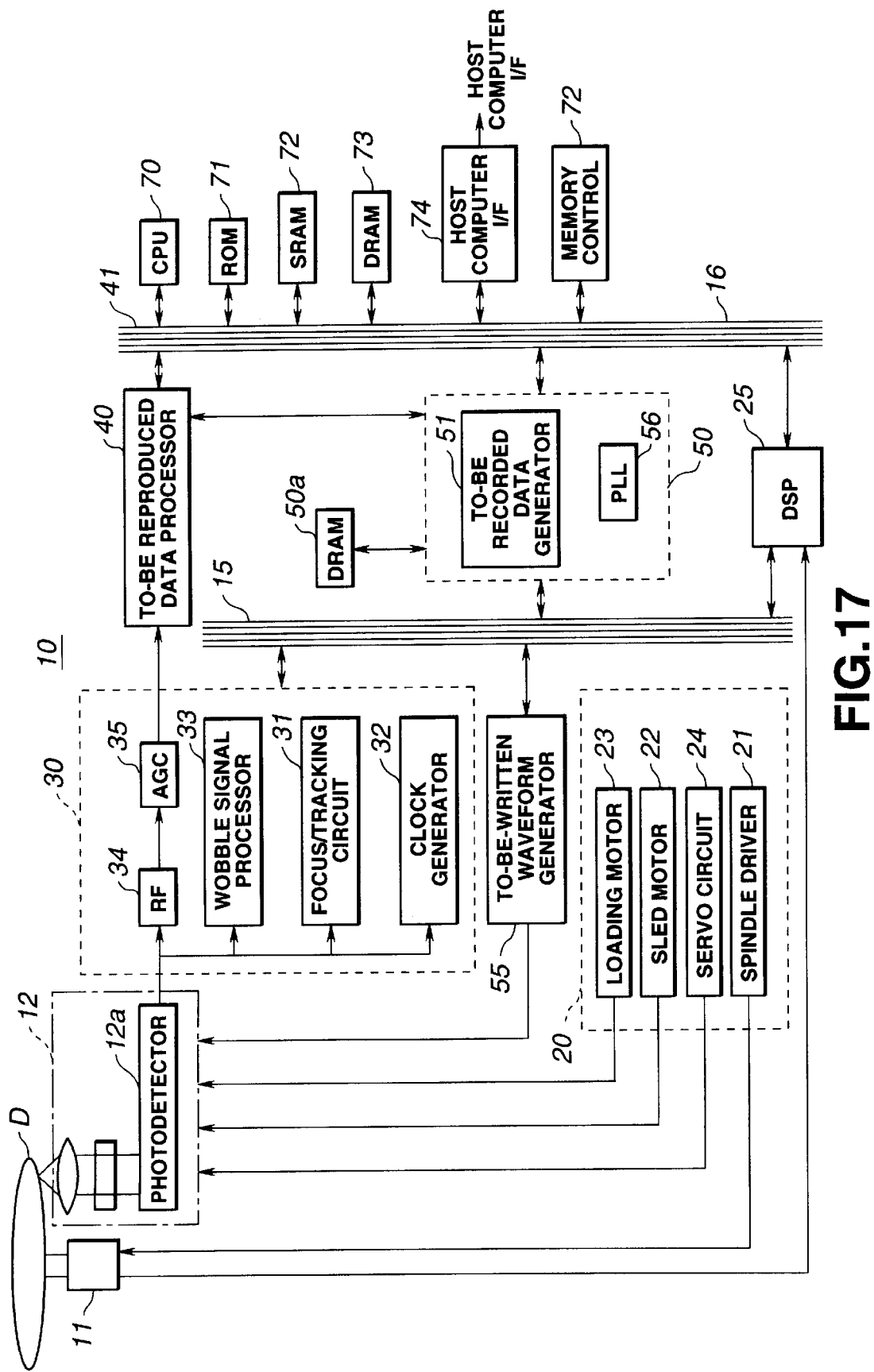
FIG. 17 is a schematic block diagram of the data recording apparatus according to the present invention.

FIG. 17 shows, in the form of a schematic block diagram, the data recording apparatus according to the present invention. The data recording apparatus of the present invention is generally indicated with a reference 10. As shown, the data recording apparatus 10 comprises a spindle motor 11 to support and drive to spin an optical disc D at a predetermined speed, an optical head 12 to record an information signal into the optical disc D by irradiating a laser beam onto the optical disc D, and a driver circuit 20 to drive the spindle motor 11 and optical disc 12. The data recording apparatus 10 further comprises a DSP (Digital Signal Processor) 25 which receives a control signal from a CPU (Central Processing Unit) 70 to control the driver circuit 20.

The spindle motor 11 has a turn-table on which the optical disc D is rotatably supported. The spindle motor 11 drives to spin the turn-table, thereby driving to spin the optical disc D supported on the turn-table. The spindle motor 11 is adapted to drive to spin the optical disc D at a predetermined speed under a signal from a spindle driver 21 which will be further described later. Also the spinning speed of the optical disc D driven by the spindle motor 11 is detected by the DSP 25.

The optical head 12 comprises a light source which emits a laser beam, an optical system to collimate and project the laser beam from the light source onto the optical disc D, a photodetector 12a to detect a return or reflected light from the optical disc D, and a focus/tracking control mechanism including coils, etc.

Supplied with a to-be-recorded data supplied from a to-be-recorded waveform generator which will be further described later, the light source is driven. The light source generates a laser beam with a predetermined write frequency and intensity corresponding to the supplied to-be-recorded data. Also the light source is adapted to emit a laser beam of a predetermined intensity for changing the phase of the optical disc D on which a data is going to be recorded as well as to emit a laser beam of a lower intensity than the predetermined one for reproducing a recorded data from the optical disc D.

The optical system comprises an objective lens, for example, to collimate and project a laser beam from the light source onto the optical disc D. The optical system is adapted to collimate a laser beam to a spot of a predetermined diameter on the optical disc D by moving the objective lens in a direction toward or away from the optical disc D.

The focus/tracking control mechanism is adapted to drive, based on a signal from the driver circuit 20, the optical head 12 in a tracking direction as well as in a focusing direction. This mechanism thus collimates a laser beam from the light source to a predetermined position on the optical disc D.

When recording or reproducing data into or from the optical disc D, the photodetector 12a detects a return or reflected light from the optical disc D. The photodetector 12a is adapted to convert the return light to an electric signal and supplies it to a signal detector which will be further described later. Namely, the photodetector 12a supplies the generated electric signal as a to-be-reproduced data to an RF circuit, and supplies it to a focus/tracking circuit 31, clock generator 32 and wobble signal processor 33 as well.

The driver circuit 20 comprises a sled motor 22 to move the optical head 12 radially of the optical disc D, a loading motor 23 to load the turn-table, a servo circuit 24 to control focus and tracking of the optical disc D, and the aforementioned spindle driver 21 which drives the spindle motor 11.

The sled motor 22 moves the optical head 12 radially of the optical disc D under a signal from the DSP 25 of CPU 70. The sled motor 22 is adapted to position, by moving, the optical head 12 to above a predetermined data track for data recording or reproduction.

The loading motor 23 loads the turn-table under a signal from the CPU 70.

The servo circuit 24 is driven under an electric signal detected by the focus/tracking circuit 31, which will be further described later, and supplied from the photodetector 12a. The servo circuit 24 is adapted to control the focus and tracking by applying a drive voltage to a coil which moves the objective lens of the optical head 12 in a direction toward or away from the optical disc D under a signal from the DSP 25, and a coil which moves the objective lens radially of the optical disc D, respectively.

The spindle driver 21 supplies a drive signal to the spindle motor 11 under a signal from the DSP 25 or CPU 70. More particularly, the spindle driver 21 is adapted to supply the spindle motor 11 with a drive signal which allows the optical disc D to spin at a predetermined speed under a signal from the DSP 25 or CPU 70 for data recording into the optical disc D.

The DSP 25 controls the above-mentioned sled motor 22, loading motor 23, servo circuit 24 and spindle driver 21. More particularly, supplied, from a signal detector 30, with a servo control signal including a focus correction signal and tracking correction signal based on an electric signal detected by the focus/tracking circuit 31 and supplied from the photodetector 12a, the DSP 25 generates, for supply to the driver circuit 20, a signal which controls the tracking and focusing.

The data recording apparatus 10 according to this embodiment comprises the signal detector 30 which receives the electric signal from the photodetector 12a, a to-be-reproduced data processor 40 which is supplied with a signal from the signal detector 30, a to-be-recorded data processor 50 to generate a to-be-recorded data, and a to-be-recorded waveform generator 55 which supplies the to-be-recorded data to the optical head 12.

The signal detector 30 comprises an RF circuit 34 to detect an RF signal from the photodetector 12a, and an AGC (Automatic Gain Control) circuit 35.

The RF circuit 34 is supplied with an electric signal based on a laser beam detected from the photodetector 12a. It detects an RF component of the electric signal and supplies it to the AGC circuit 35.

The AGC circuit 35 stabilizes the amplitude of the RF signal coming from the RF circuit 34. It delivers the amplitude-adjusted RF signal as a to-be-reproduced data to the to-be-reproduced data processor 40.

The aforementioned focus/tracking circuit 31, clock generator 32 and wobble signal processor 33, to which an electric signal is supplied from the photodetector 12a, are included in the signal detector 30.

The focus/tracking circuit 31 detects a tracking error and focusing error under an electric signal from the photodetector 12a, This circuit 31 employs the pushpull method, for example, to detect a tracking error, and the astigmatism, for example, to detect a focusing error. It supplies the above-mentioned DSP 25 with the tracking and focusing errors as servo control signals.

The clock generator 32 detects from a pushpull signal from the photodetector 12a an electric signal corresponding to a fine clock mark formed on the optical disc D. The clock generator 32 comprises an HPF and zero-cross detector as will be discussed later, and it generates a clock signal from an electric signal corresponding to the fine clock mark, and supplies it to the to-be-recorded waveform generator 55.

The wobble signal processor 33 comprises a BPF and an FM modulator, for example, which will be further discussed later. By passing a pushpull signal from the photodetector 12a through the BPF, the wobble signal processor 33 detects a wobble signal, processes it by the FM modulator, and then delivers it to the to-be-recorded data processor 50. The wobble signal processor 33 is adapted to generate an address information indicating a track number by decoding the FM modulated wobble signal. It supplies the address information to the to-be-recorded data processor 50 via a data bus 15.

The to-be-reproduced data processor 40 is supplied with a to-be-reproduced data from the AGC circuit 35 of the signal detector 30. In the to-be-reproduced data processor 40, the supplied to-be-reproduced data is subjected to 8/16 modulation, data compensation and other processing. The to-be-reproduced data processor 40 also comprises a PLL (Phase-Locked Loop) circuit in which a sync signal is generated to detect a to-be-reproduced data.

The to-be-recorded data processor 50 is supplied, via a host bus 16, with a user data from a host computer which will be further described later. The to-be-recorded data processor 50 comprises a to-be-recorded data generator 51 which generates a to-be-recorded data, and a PLL circuit 56, and it is connected to a DRAM (Dynamic Random Access Memory) 50a.

The to-be-recorded data generator 51 comprises an encoder to encode a user data supplied over a host bus 41. This circuit 51 stores the encoded user data into the DRAM 50a once.

The to-be-recorded data generator 51 is connected to the CPU 70 via the host bus 41 and supplied with an information indicative of a number of bits per sector. This circuit 51 changes the number of bits of linking data in each sector according to the written bit count information to generate a to-be-recorded data. Also, when generating a to-be-recorded data, the circuit 51 also adds management information such as address information to generate a to-be-recorded data for recording in each sector consisting of an ECC block and linking data.

Figure 18:
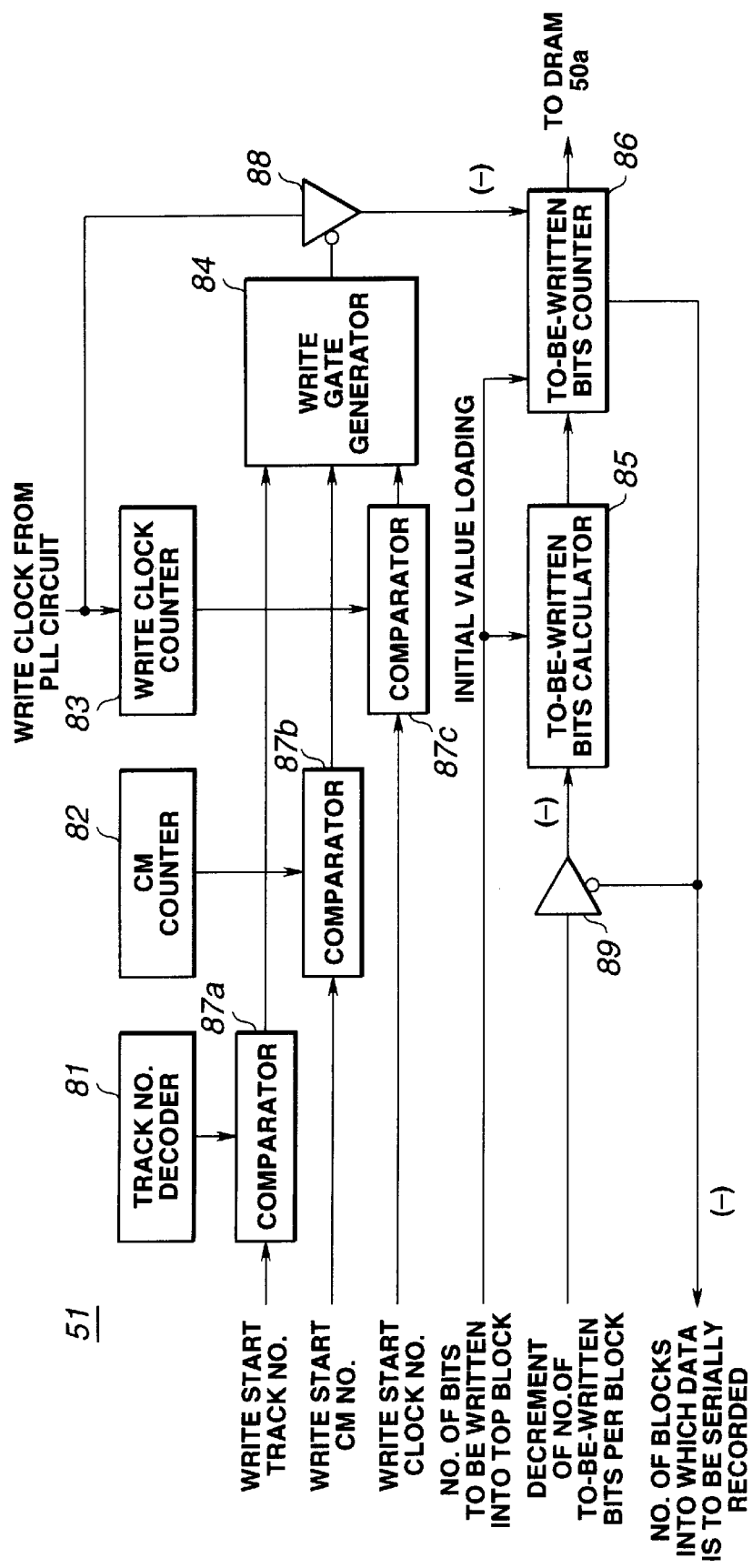
FIG. 18 is also a schematic block diagram of the to-be-recorded data generation circuit.

FIG. 18 is also a schematic block diagram of the to-be-recorded data generation circuit 51. As shown, when generating a to-be-recorded data as above, the circuit 51 is supplied, over the host bus 41, with a write start track number, write start clock mark number and a control signal indicative of the write start clock number from the CPU 70.

The to-be-recorded data generator 51 comprises a track number decoder 81 to decode an address signal indicative of a track number from the wobble signal processor 33, a clock mark counter 82 to count clock mark signals from the PLL circuit 56, a write clock counter 83 to count write clock signals, a write gate generator 84 to generate a write start signal, a to-be-written bits calculator 85 to calculate a number of bits for writing into each sector, and a to-be-written bits counter 86 to count bits to be written by the optical disc 12.

The track number decoder 81 decodes a track number-indicating address information from the wobble signal processor 33 and supplies a comparator 87a with a track number under scanning by the optical head 12.

The comparator 87a is supplied with a write start track number from the CPU 70 and an address information from the track number decoder 81, and makes a comparison between the write start track number and address information. When the comparison result shows a coincidence between the write start track number and the track number the address information, the comparator 87a supplies the write gate generator 84 with the comparison result indicating the coincidence.

By counting a clock mark signal from the PLL circuit 56, the clock mark counter 83 recognizes the number of the clock mark. It supplies a comparator 87b with a clock mark number based on the clock mark signal from the PLL circuit 56.

The comparator 87b compares a write start clock mark number from the CPU 70 with the clock mark number from the clockmark counter 82. When the comparison result shows a coincidence between the clock mark numbers, the comparator 87b supplies the comparison result to the write gate generator 84.

The write clock counter 83 is supplied with, and counts write clocks from the PLL circuit 56. It supplies the count result to a comparator 87c.

The comparator 87c is supplied with a write start clock number from the CPU 70, and a count result based on a write clock signal from the write clock counter 83. When the supplied result of counting is found to coincide with the write start clock number, the comparator 87c supplies the result of comparison to the write gate generator 84.

The write gate generator circuit 84 is supplied with the results of comparison from the comparators 87a to 87c, respectively, and generates, based on the results of comparison, an open/close signal under which a switch 88 is controlled for opening or closing. The circuit 84 controls to open or close the switch 88 by supplying the switch 88 with control signals based on all the results of comparison from the comparators 87a to 87c.

Namely, in the to-be-recorded data generator circuit 51, the write clock signal from the PLL circuit 56 is supplied to the to-be-written bits counter 86 with the switch 88 kept closed to start recording when the track number detected by the track number decoder 81 coincides with the write start track number from the CPU 70, the clock mark number detected by the clock mark counter 82 coincides with the write start clock mark number from the CPU 70 and the result of counting detected by the write clock counter 83 coincides with the write start clock number from the CPU.

Also the to-be-recorded data generator 51 is supplied, from the CPU 70, with a number of bits for writing into a top block, a difference in number of to-be-written bits from one to another sector, and a number of sectors into which data is serially recorded.

The to-be-recorded data generator 51 includes the aforementioned to-be-written bits calculator 85 which is supplied with a number of bits for writing into a top block and a difference in number of to-be-written bits from one to another sector, and to-be-written bits counter 86 which is supplied with an output signal and number of bits to be written into the top block from the to-be-written bits calculator 85 and a write clock signal having passed through the switch 88.

The to-be-written bits calculator 85 is supplied, from the CPU 70, with a number of bits to be written into a sector in which data is first written, and also with a difference in number of to-be-written bits from one to another sector via a switch 89. More particularly, the to-be-written bits calculation circuit 85 is supplied with an information indicative of a number of bits for writing into the sector n, for example, and an information indicative of a difference in number of to-be-written bits between the sector n and next sector n+1. Based on the supplied information, the circuit 85 calculates a number of bits to be written into the sector n+1, and supplies the to-be-written bits counter 86 with the calculated number of written bits in the sector n+1.

The to-be-written bits counter 86 is supplied with an information indicative of the number of bits to be written in the sector n and also with a write clock signal from the PLL circuit 56 via the switch 88, and thus counts each of the to-be-written bits delivered from the to-be-recorded data generator circuit 51. More particularly, when supplied with a number of bits for writing into the sector n from the CPU 70, the to-be-written bits counter 86 decreases the number of to-be-written bits by counting the to-be-recorded data in the sector n delivered from the to-be-recorded data generator 51 according to the write clock signal from the PLL circuit 56. Also, when the number of to-be-written bits becomes zero, the to-be-written bits counter 86 delivers to the CPU 70 a zero flag indicating that the recording into the sector n has been completed. Based on the zero flag from the to-be-written bits counter 86, the CPU 70 judges whether recording into all the sectors has been completed.

The to-be-recorded data generator 51 is supplied with a clock signal from the signal detector 30 via the to-be-written waveform generator 55 and a data transfer timing signal from the to-be-written waveform generator 55. The circuit 51 delivers at DRAM 50a the generated to-be-recorded data to the to-be-written waveform generator 55 under the supplied data transfer timing signal and a clock.

The to-be-recorded waveform generator 55 supplies the optical head 12 with a signal having a to-be-written waveform corresponding to the to-be-recorded data from the to-be-recorded data generator 51.

The PLL circuit 56 comprises a VFO to generate an iterative data pattern which will be further described later, a frequency divider to divide the data pattern from the VFO, and a phase comparator which is supplied with an output from a zero-cross detector of the clock generator 32 and an output from the frequency divider. The frequency divider is supplied, from the CPU 70, with a predetermined frequency division ratio at which it divides the data pattern from the VFO. The to-be-written waveform generator 55 is thus adapted to generate a write clock signal which is used in data recording into the to-be-recorded data processor 50.

The to-be-written waveform generator 55 is also supplied with a to-be-recorded data from the to-be-recorded data generator 51, and supplies it as a to-be-written waveform to the optical head 12.

As shown in FIG. 17, the host bus 41 has connected thereto the CPU 70, a ROM (Read-Only Memory) 71, a SRAM (Static Random Access Memory) 72, a DRAM 73, a host I/F (interface) 74 and a memory controller 75.

The ROM 71 stores a calculation program used for the CPU 70 to calculate a number of bits to be written into each sector, for example. In the SRAM 72 and DRAM 73, information is rewritten as necessary for the host computer or CPU 70, for example. The memory controller 75 controls the ROM 71, SRAM 72, DRAM 73 or DRAM 50a according to a control signal from the CPU 70.

The host I/F 74 is connected to an external host computer, for example. The host I/F 74 supplies with a user data from the host computer under a control signal from the CPU 70, and delivers a signal recorded in the optical disc D.

The CPU 70 is connected to the host bus 41 and controls the above-mentioned component units. It is connected to the driver circuit 20 and generates a control signals allowing the spindle driver 21 to spin the optical disc D at a predetermined speed for a constant angular velocity when letting the optical head 12 record or reproduce a data into or from the optical disc D.

When supplied with an instruction for write of a user data from the host I/F 74 into the optical disc D, the CPU 70 controls the above-mentioned component units to supply the DRAM 50a with the user data supplied from the host I/F 74. Thereafter, under a write instruction from the host computer, the CPU 70 generates, for delivery to the to-be-recorded data generator 51, a write start track number, write start clock mark number and write start clock number corresponding to an optical disc D into which a data is going to be recorded. Further, the CPU 70 generates, for supply to the to-be-recorded data generator 51, a number of to-be-written bits, decrement of to-be-written bits and a number of blocks into which data is serially recorded according to the amount of information already existing in the optical disc D into which the to-be-recorded data is going to be recorded.

Further, the CPU 70 generates control signals indicating a sector n the optical head 12 records onto the optical disc D, physical information of the optical disc D and a physical length of one ideal sector. The physical length of one ideal sector is such that an ECC block of 32 kilobytes is recorded with the above-mentioned predetermined linear density and a linking data of 2 kilobytes is recorded. That is, the physical length of one ideal sector is calculated by multiplying a length per ideal bit by a number of bits in one ideal sector. Also the CPU 70 holds a track pitch in μm and innermost position of the data area in mm, as physical information of the optical disc D.

Figure 19A:
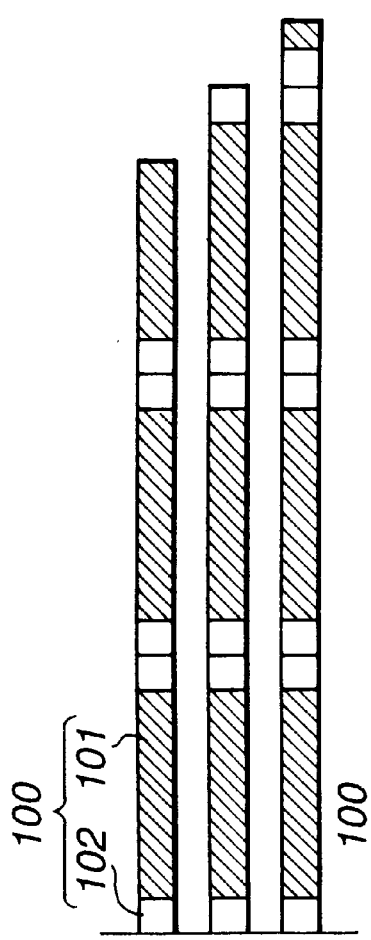
FIG. 19A shows ideal sectors in the n-th zone, in which data is recorded.
Figure 19B:
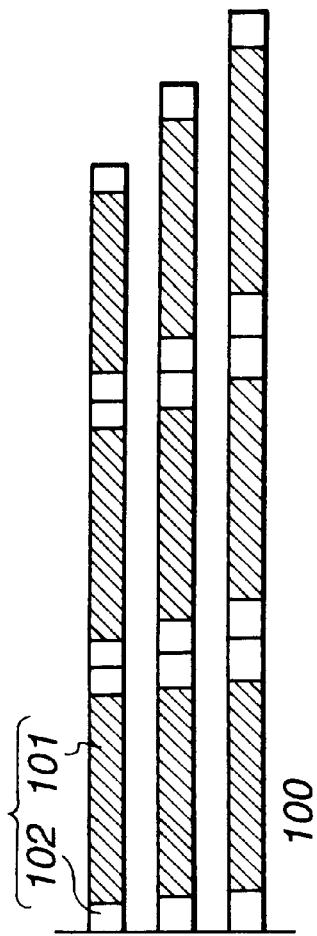
FIG. 19B shows sectors in which data is recorded in the lead-in zone and lead-out zone at a same frequency and speed of disc spinning.

FIG. 19A shows ideal sectors in the n-th zone, in which data is recorded. When data is recorded in ideal sectors, each of the sectors 100 consists of an ECC block 101 of 32 kilobytes and a linking data of 2 kilobytes. Even if each sector is recorded in the lead-out zone, each linking data will have a same length as in the sector in the lead-in zone. On the other hand, when a sector consisting of an ECC block 101 of 32 kilobytes and a linking data of 2 kilobytes is recorded in each of the lead-in and lead out zones at a same frequency and speed of disc spinning, the linear density will actually be higher and physical length of each sector will be larger in the lead-out zone than in the lead-in zone as will be seen from FIG. 19B.

The control signal indicative of the sector n recorded by the optical disc D indicates the number for one of the sectors that is to be recorded into the optical disc D. The sectors are disposed spirally along the groove 5 in the order of 1, 2, ..., n, n+1, ... from the center of the optical disc D. That is, the CPU 70 generates, for supply to the to-be-recorded data generator 51, a control signal allowing the optical head 12 to record the sector n into the optical disc D.

Further the CPU 70 generates a control signal for recording the sector n in each zone, and selects a write frequency from a table stored in the ROM 71, for example.

Furthermore, to record the sector n, the CPU 70 selects a write frequency for each zone. More particularly, the CPU 70 calculates the radial position of the sector n, thereby selecting a write frequency for a zone into which the sector n is to be recorded.

Based on the write frequency for the sector n, the CPU 70 generates, according to the following expression (1), an information indicative of a number of bits for writing into each sector in a same zone.

$$\frac{F}{2\pi \cdot N} \cdot \frac{2\pi}{P} \left( \sqrt{R_0^2 + \frac{PL}{\pi}(n+1)} - \sqrt{R_0^2 + \frac{PL}{\pi}n} \right) \quad (1)$$

where

F: Write frequency, Hz

N: Spinning speed of optical disc D, $s^{-1}$ $R_0$: Radius of innermost data track on which bits are to be written, m P: Track pitch of data tracks, m L: Circumferential physical length of each sector The CPU 70 calculates a physical length L of each to-be-recorded sector by multiplying a circumferential length per bit by a number of bits per sector.

The expression is used to calculate a number of bits in the sector n based on a difference between an angle formed by the sector n, for example, and an angle formed by the sector n+1.

The CPU 70 generates, for supply to the to-be-recorded data generator 51, a write start track number, write start clock mark number and write start clock number, all indicating a position at which recording is started as mentioned above, and also generates base on the expression (1), for supply to the to-be-recorded data generator 51, information indicating a number of bits for writing into a top sector, difference in number of bits to be written between each of subsequent sectors and the top sector, and a number of sectors in which data is serially written.

Figure 19C:
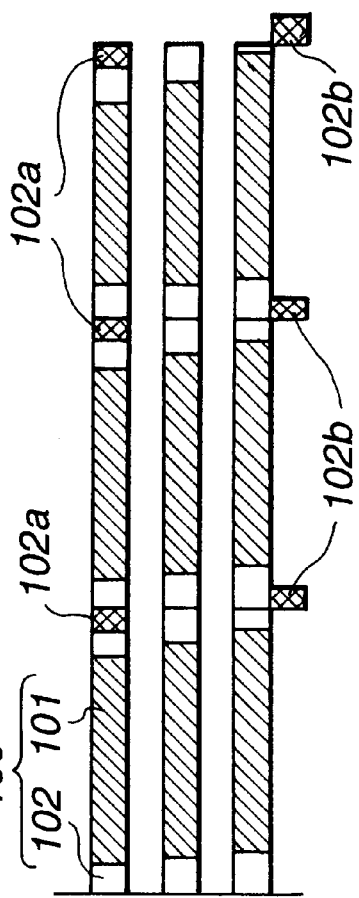
FIG. 19C shows sectors in which data is recorded by the data recording apparatus according to the present invention.

More particularly, supplying the above-mentioned information to the to-be-recorded data generator 51, the CPU 70 has the circuit 51 delete or add a linking data included in each sector. The CPU 70 can control the position of a sector as shown in FIG. 19C by calculating a number of bits for deletion or addition of the linking data in order to record each sector.

At this time, the spindle driver 8 is supplied, from the CPU 70, with a control signal which allows the optical disc D to spin at a predetermined speed. Thus, under the control signal, the spindle driver 8 drives the spindle motor 11 to spin the optical disc D at the predetermined speed.

Figure 20:
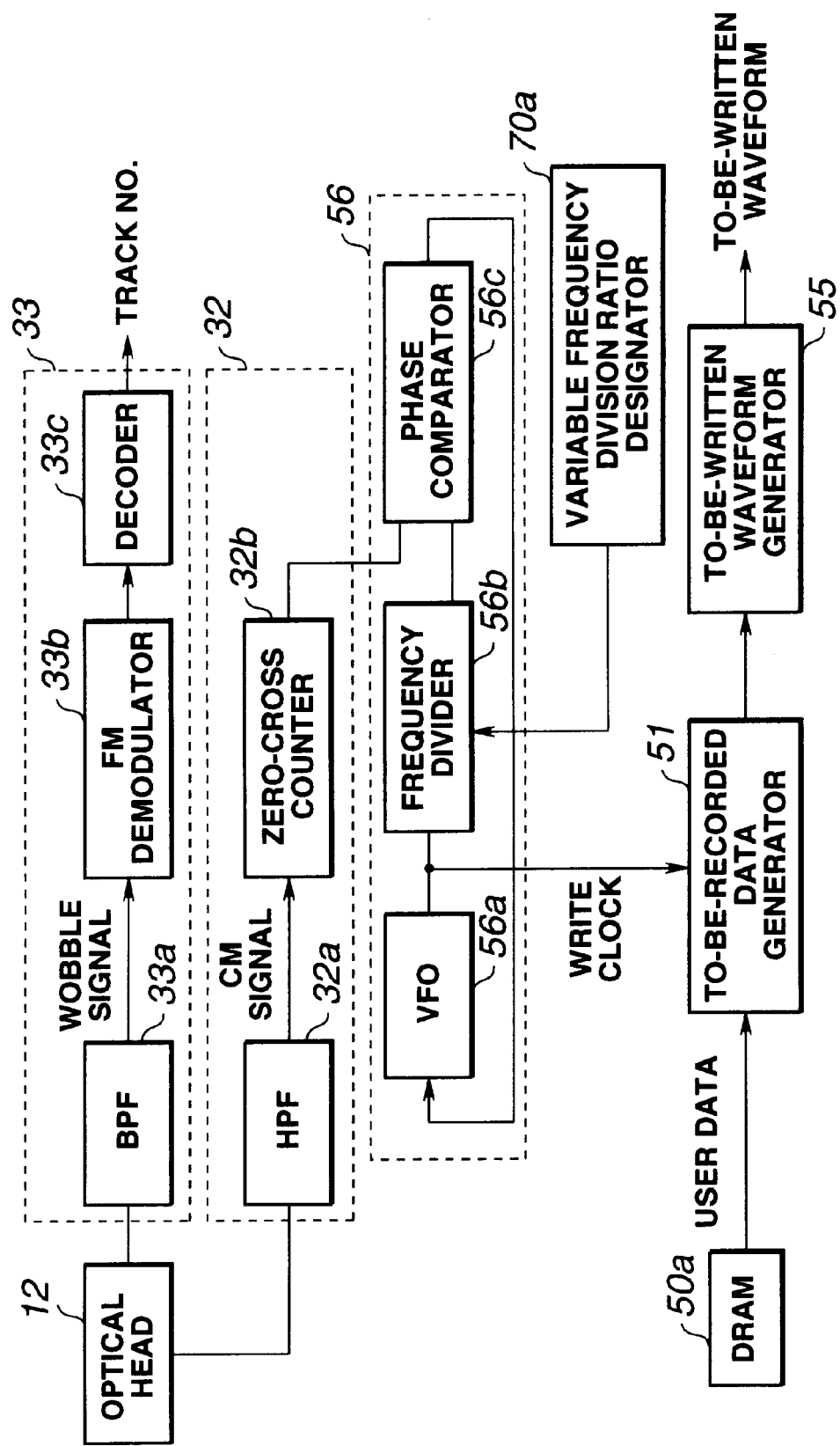
FIG. 20 is a schematic block diagram of the data recording apparatus, for explanation of the operations done for data recording.

FIG. 20 is a schematic block diagram of the data recording apparatus 10 shown in FIG. 17, for explanation of an example of the operations done for data recording into the optical disc D by letting the optical head 12 seek a target position. As shown in FIG. 20, a pushpull signal from the photodetector 12a of the optical head 12 is supplied to the wobble signal processor 33 in which it is passed through a BPF 33a to provide a wobble signal. The wobble signal is passed through an FM modulator 33b and decoder 33c in which it is processed to be an address signal indicative of a track number. The wobble signal processor 33 supplies the address signal to the to-be-recorded data processor 50.

On the other hand, the pushpull signal from the photodetector 12a of the optical head 12 is passed through a HPF 32a of the clock generator 32 to provide a clock mark (CM) signal which is supplied via a zero-cross counter 32b to the PLL circuit 56 provided in the to-be-recorded data processor 50 and which comprises a VFO 56a, frequency divider 56b and a phase comparator 56c.

The frequency divider 56b of the PLL circuit 56 is supplied, from a variable frequency division ratio designator 70a, with a frequency division ratio for each zone. Based on the frequency division ratio, a write frequency generated by the PLL circuit 56 is changed. More particularly, the CPU 70 controls the PLL circuit 56 to generate a write frequency by changing the number of bits for writing between clock marks according to a zone number in which a sector is to be recorded. Thereby, bits are written with a constant linear density and at a frequency changed for each zone.

The to-be-recorded data generator 51 of the to-be-recorded data processor 50 reads a user data stored in the DRAM 50a to generate a to-be-recorded data, and supplies the to-be-written waveform generator 55 with the generated to-be-recorded data under the write clock signal. The to-be-recorded wave generator 55 supplies the to-be-recorded data as a to-be-written waveform to the optical head 12. Thus, the optical head 12 emits a laser beam from the light source according to the to-be-written waveform from the to-be-written waveform generator 55 in order to record the to-be-recorded data into the optical disc D.

Figure 21:
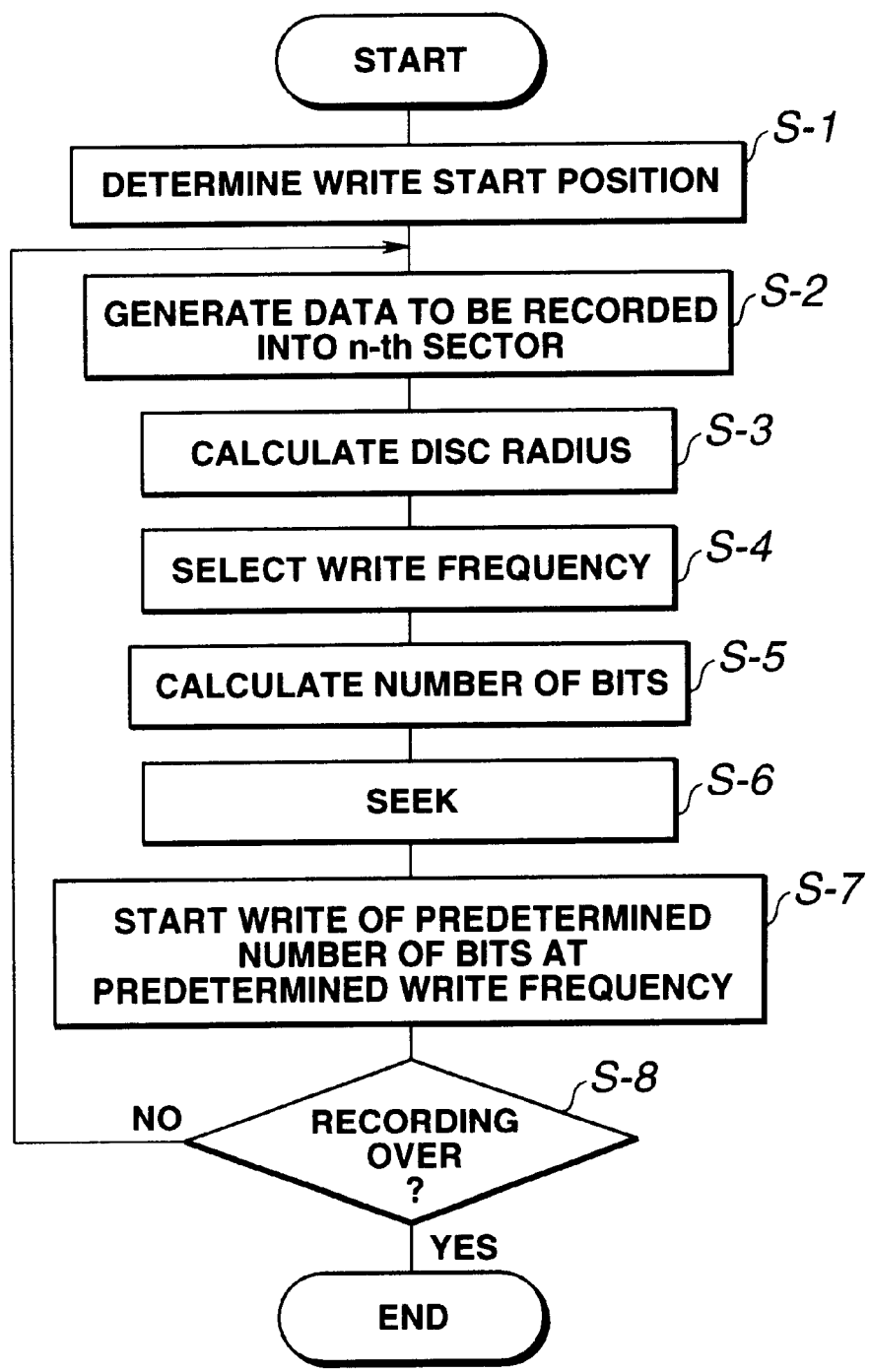
FIG. 21 is a functional flow chart of an example of data recording by the data recording apparatus of the present invention.

FIG. 21 is a functional flow chart of an example of data recording into each sector on the optical disc D by the data recording apparatus 10 of the present invention. At Step S-1, the CPU 70 designates a track number into which data is to be recorded. At this time, the CPU 70 determines a write start position on the optical disc D at which each to-be-recorded data is to be written, by designating, for supply to the to-be-recorded data generator 51, a write start track number, write start clock mark number and a write start clock number. In the to-be-recorded data generator 51, these write start track number, write start clock mark number and write start clock number are compared with an address signal from the wobble signal processor 33, clock mark signal from the PLL circuit 56 and a write clock signal, respectively, to determine a write start position. Then the CPU 70 proceeds to Step S-2.

At Step S-2, the to-be-recorded data generator 50 generates a data for recording into the sector n. It acquires a user data from the DRAM 50a and generates a sector n consisting of an ECC block of 32 kilobytes and a linking data of 2 kilobytes. Then the CPU 70 proceeds to Step S-3.

At Step S-3, the CPU 70 calculates, from the write start track number, a radial position at which the sector n is to be recorded, and determines, based on the radial position thus calculated, a zone number into which the sector n is to be recorded. Then the CPU 70 proceeds to Step S-4.

At Step S-4, the CPU 70 selects a write frequency from the zone number into which the calculated sector n is to be recorded, by making a reference to the table stored in the ROM 71, for example. Then the CPU 70 proceeds to Step S-5.

At Step S-5, the CPU 70 uses the aforementioned expression (1) to calculate a number of bits for writing into the sector n, and supplies the calculated number of bits for the sector n to the to-be-written bits calculator 85 and to-be-written bits counter 86 in the to-be-recorded data generator 51. Then the CPU 70 proceeds to Step S-6.

At Step S-6, the to-be-recorded data generator 51 lets the optical head 12 seek a target position in which the sector n is to be written, according to the write start track number, write start clock mark number and write start clock number from the CPU 70. Then the CPU 70 proceeds to Step S-7.

At Step S-7, the to-be-written bits counter 86 is driven synchronously with a write clock signal corresponding to the above-mentioned write frequency. Thus, the to-be-recorded data generator 51 supplies the to-be-written waveform generator 55 with a to-be-recorded data according to a bit count from the to-be-written bits counter 86. The to-be-written waveform generator 55 converts the to-be-recorded data into a to-be-written waveform and supplies it to the optical head 12 which in turn will start recording of the to-be-recorded data at a position designated as in the above by the CPU 70. Then the CPU 70 proceeds to Step S-8.

At Step S-8, it is judged whether the number of sectors in which data is serially recorded, designed by the CPU 70, has been counted down to zero by the to-be-written bits counter 86. Thereby, it is judged whether the recording is complete or not.

When the number of sectors in which data is serially recorded has not yet been reduced to zero, the CPU 70 will start a recording procedure from Steps S-2 to S-8 for a next sector n+1. When the number of sectors is found to be zero, the CPU 70 will terminate the recording to the optical disc D.

Alternatively, the CPU 70 may put into run the calculation program stored in the ROM 71 for calculation of a number of bits for writing into each sector in order to write a to-be-recorded data into the optical disc D.

Figure 22:
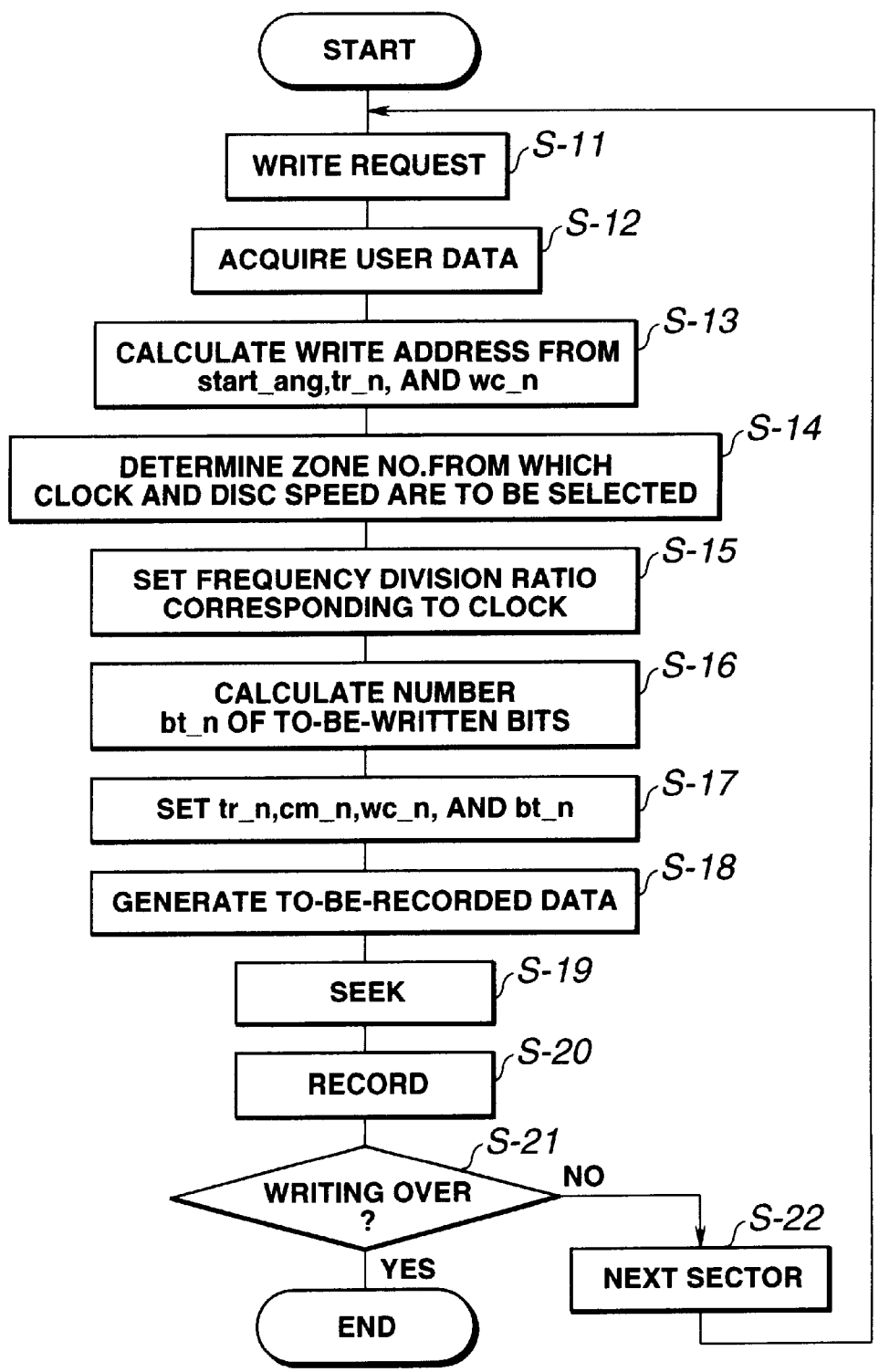
FIG. 22 is a functional flow chart of another example of data recording by the data recording apparatus of the present invention.

FIG. 22 is a functional flow chart of another example of data recording using the above-mentioned calculation program to write a to-be-recorded data into the optical disc D.

As shown in FIG. 22, first at Step S-11, a write request for writing a user data into the optical disc D is supplied to the CPU 70 from the host computer via the host I/F 74. According to the write request, the CPU 70 will acquire the calculation program from the ROM 71. Then the CPU 70 proceeds to Step S-12. It should be noted that the write request is a request for writing data serially into blocks from start-B to num_B.

At Step S-12, the CPU 70 interprets the content of the write request on the basis of the calculation program and supplies the host I/F 74 with a control signal for storage into the DRAM 50a. Then the CPU 70 proceeds to Step S-13.

At Step S-13, the CPU 70 determines, under the calculation program, an angle start_ang formed by a first sector in which data is to be recorded, track number tr_n, clock mark number cm_n and write clock number wc_n as shown in following expressions (2) to (7). Then the CPU 70 proceeds to Step S-14.

$$\text{start\_ang}_{[rad]} = \frac{2\pi}{P}\left(\sqrt{R_0^2 + \frac{PL}{\pi}num\_B} - R_0\right) \quad (2)$$

$$R_0 + \frac{\text{start\_ang}}{2\pi}P[m] \quad (3)$$

$$tr\_n\_f = \frac{1}{P}\left(R_0 + \frac{\text{start\_ang}}{2\pi}P\right) = \frac{R_0}{P} + \frac{\text{start\_ang}}{2\pi} \quad (4)$$

$$tr\_n = [tr\_n\_f] \quad (5)$$

$$cm\_n[96 \times (tr\_n\_f - tr\_n)] \quad (6)$$

$$wc\_n = \left[\frac{2\pi(R_0 + P \cdot tr\_n\_f)\left[tr\_n\_f - tr\_n - \frac{cm\_n}{96}\right]}{B}\right] \quad (7)$$

where

P: Track pitch on the optical disc D $R_0$: Top position of data track in data zone L: Length of each sector B: Length per bit.

The expressions (5) to (7) indicate that the track number tr__n, clock mark number cm__n and write clock number wc__n are smaller integers, respectively, than calculated.

Also the expression (3) indicates a radial position when the first sector is recorded at the angle start__ang, the expression (4) is used to use the radial position calculated using the expression (3) for calculation of a track number when the first sector is recorded at the angle start__ang.

At Step S-14, the CPU 70 determines, for each sector, a zone number into which a to-be-recorded data is written, according to the track number tr__n. Then, referring to the table stored in the ROM 71, for example, and which lists a write frequency for each zone number and a spinning speed for the optical disc D, the CPU 70 will select a write frequency wc__f and spindle motor speed mt__f for each zone number. Then the CPU 70 proceeds to Step S-15.

At Step S-15, the CPU 70 sets a frequency division ratio for the write frequency wc__f in the frequency divider in the PLL circuit 56 which generates a write clock signal for the write frequency. Then the CPU 70 proceeds to Step S-16.

At Step S-16, the CPU 70 uses the above-mentioned expression (1) to calculate a number bit__n of bits necessary for recording the sector n. Then the CPU 70 proceeds to Step S-17.

At Step S-17, the CPU 70 will supply the to-be-recorded data processor 50 with the track number tr__n, clock mark number cm__n and write frequency wc__n having been determined in the above process for recording the sector n, and a number of bits bit__n to be written into the sector n. Then, the to-be-recorded data processor 50 supplies the track number tr__n to the comparator 87a and clock mark number cm__n to the comparator 87b, generates, for supply to the write clock PLL circuit 56, the write frequency wc__n as write clock signal, and supplies the to-be-written bits counter 86 with the number bit__n of bits to be written into the sector n. The CPU proceeds to Step S-18.

Next at Step S-18, the to-be-recorded data processor 50 generates a sector stored in the DRAM 50a and consisting of an ECC block and linking data on the basis of a number bit__n of to-be-written bits supplied from the CPU 70. At this time, the to-be-recorded data processor 50 deletes or adds the linking data inherently of 2 kilobytes by adjusting the number of bits forming the linking data according to the number of to-be-written bits supplied from the CPU 70.

Then, the CPU 70 proceeds to Step S-19.

At Step S-19, the optical head 12 will be moved to a track designated by the CPU 70. Also, the optical disc D is driven to spin at a predetermined speed. The to-be-recorded data generator 51 compares an address signal indicative of the track number with the track number tr__n supplied from the CPU 70 to effect a seek by which the clock mark counter 82 and write clock counter 83 recognize where on the track the optical head 12 is positioned. Then the CPU 70 proceeds to Step S-20.

Next at Step S-20, when it has been recognized that the optical head 12 is at a designated position, the to-be-recorded data generator 51 delivers at the to-be-recorded data processor 50 a to-be-recorded data to the to-be-written waveform generator 55 according to the write frequency wc__n. The to-be-written waveform generator 55 will convert the data to a to-be-written waveform by delaying or otherwise, and supply the waveform to the optical head 12 which thus will record the data into the optical disc D. Then the CPU 70 proceeds to Step S-21.

At Step S-21, the to-be-recorded data generator 51 will judge whether all the sectors have been recorded. When the judgment result is "Yes", the operation is terminated. If the judgment result is "No", the CPU 70 proceeds to Step S-22 where it will repeat the procedure from Steps S-11 to S-20 again for a next sector. Thus, the sector n+1 and subsequent ones are recorded.

Therefore, the data recording apparatus 10 constructed as having been described in the foregoing is capable of recording a to-be-recorded data for each sector into the optical disc D by changing the number of bits for writing into each sector. Even if the linear density of recording varies from the lead-in zone to lead-out zone on the optical disc D, the data recording apparatus 10 of the present invention can control the write position for each sector by deleting or adding the linking data. Thus, data can be recorded by positioning a writing position in each of radial data tracks so that the tacks are radially aligned with each other. The data recording apparatus 10 of the present invention can attain a more rapid seek for reproduction of a recorded data.

What is claimed is:

1. A data recording apparatus comprising:

means for driving a disc-like recording medium having pre-formed thereon data tracks for data recording, the data tracks being wobbled with signals generated by modulating the frequency of a predetermined-frequency carrier correspondingly to an address information;

means for recording into the disc-like recording medium being driven to spin a data in sectors each consisting a data block and a linking data next to the data block in such a manner that the linear density of recording is constant;

means for calculating a number of bits which are to be recorded into an n-th one of the sectors on the basis of a following expression (1):

$$\frac{F}{2\pi \cdot N} \cdot \frac{2\pi}{P}\left(\sqrt{R_0^2 + \frac{PL}{\pi}(n+1)} - \sqrt{R_0^2 + \frac{PL}{\pi}n}\right) \quad (1)$$

where

F: Write frequency, Hz

N: Spinning speed of the recording medium, $s^{-1}$ $R_0$: Radius of innermost data track on which the bits are to be recorded, m P: Track pitch of data tracks, m L: Physical circumferential length of each sector, m; and means for controlling the recording means so that the data is recorded in a number of bits having been calculated by the calculating means into each sector.

2. The data recording apparatus of claim 1, wherein each of the data tracks on the recording medium has formed thereon a plurality of zones to record the data with a generally constant linear density, and wobbling marks to allow the recording medium to attain a constant angular velocity when driven to spin by the driving means.

3. The data recording apparatus of claim 1, further comprising:

a data table in which the write frequency is recorded for each of the data tracks, and wherein:

the calculating means selects from the data table a write frequency for a data track into which bits are to be recorded and calculates a number of bits in each sector on the basis of the expression (1) and selected write frequency.

4. The data recording apparatus of claim 3, further comprising:

means for calculating a radial position on the recording medium of a data track onto which bits are to be recorded; wherein the calculating means for the number of bits to be recorded selects from the data table a write frequency corresponding to the radial position of the data track and calculates a number of bits in each sector on the basis of the expression (1) and selected write frequency.

5. The data recording apparatus of claim 1, wherein the controlling means controls the recording means by changing a number of bits included in the linking data to change the recording location of the sector.

6. A method of recording sectors each consisting of a data block and a linking data next to the data block into a disc-like recording medium having pre-formed thereon data tracks onto which data is to be recorded, the data tracks being wobbled with signals generated by modulating the frequency of a predetermined-frequency carrier correspondingly to an address information, comprising the steps of:

calculating a radial position on the recording medium of an n-th one of the sectors to generate a position information;

determining a write frequency based on the position information;

calculating a number of bits which are to be recorded into the n-th one of the sectors on the basis of a following expression (1):

$$\frac{F}{2\pi \cdot N} \cdot \frac{2\pi}{P} \left( \sqrt{R_0^2 + \frac{PL}{\pi}(n+1)} - \sqrt{R_0^2 + \frac{PL}{\pi}n} \right) \quad (1)$$

where F:

Write frequency, Hz

N: Spinning speed of the recording medium, $s^{-1}$ $R_0$: Radius of innermost data track on which the bits are to be recorded, m P: Track pitch of data tracks, m L: Physical circumferential length of each sector, m; and recording a data in the number of bits calculated based on the expression (1) into the recording medium on the basis of the write frequency.

7. The method of claim 6, wherein each of the data tracks on the recording medium has formed thereon a plurality of zones to record the data with a generally constant linear density, and wobbling marks to allow the recording medium to attain a constant angular velocity when driven to spin by the driving means.

8. The method of claim 6, wherein the write frequency determining step includes selecting from the data table a write frequency corresponding to the position information; and wherein in the recording step, data is recorded into the recording medium on the basis of the selected write frequency.

9. The method of claim 6, wherein in the recording step, data is recorded into the recording medium in such a manner that a number of bits included in the linking data is changed base on the calculated number of bits.

* * * * *